US012579316B2

(12) United States Patent
Rowan et al.

(10) Patent No.: US 12,579,316 B2
(45) Date of Patent: Mar. 17, 2026

(54) UNLINKING ACCOUNTS FROM APPLICATIONS

(71) Applicant: Plaid Inc., San Francisco, CA (US)

(72) Inventors: William Rowan, Incline Village, NV (US); Shira Jaffe, New York, NY (US); Jordana Cohen, New York, NY (US); Maksim Rozen, New York, NY (US); Tim Wong, Brooklyn, NY (US); Kieran Parikh, Brooklyn, NY (US); Tara Jotwani, San Francisco, CA (US); Chandni Chopra Sorrentino, Brooklyn, NY (US); Wang Tian, Jersey City, NJ (US); Haochen Zhao, San Francisco, CA (US)

(73) Assignee: Plaid Inc., San Francisco, CA (US)

( * ) Notice: Subject to any disclaimer, the term of this patent is extended or adjusted under 35 U.S.C. 154(b) by 38 days.

(21) Appl. No.: 18/664,763

(22) Filed: May 15, 2024

(65) Prior Publication Data

US 2024/0386141 A1 Nov. 21, 2024

Related U.S. Application Data

(60) Provisional application No. 63/502,311, filed on May 15, 2023.

(51) Int. Cl.
*G06F 21/00* (2013.01)
*G06F 21/44* (2013.01)
*G06F 21/62* (2013.01)

(52) U.S. Cl.
CPC ............ *G06F 21/629* (2013.01); *G06F 21/44* (2013.01)

(58) Field of Classification Search
CPC .............................. G06F 21/44; G06F 21/629
See application file for complete search history.

(56) References Cited

U.S. PATENT DOCUMENTS

| | | | | |
|---|---|---|---|---|
| 12,314,434 B1 * | 5/2025 | DiGregorio | ........ | G06Q 30/0185 |
| 2006/0085676 A1 * | 4/2006 | Kobayashi | .......... | G06F 11/3051 |
| | | | | 714/10 |
| 2012/0150960 A1 * | 6/2012 | Nalawade | .............. | G06Q 50/01 |
| | | | | 709/204 |
| 2014/0215595 A1 * | 7/2014 | Prasad | .................... | G06F 21/41 |
| | | | | 726/8 |
| 2014/0278703 A1 * | 9/2014 | Owens, Jr. | ....... | G06Q 10/06313 |
| | | | | 705/7.23 |

(Continued)

*Primary Examiner* — Rodman Alexander Mahmoudi
(74) *Attorney, Agent, or Firm* — Harrity & Harrity, LLP

(57) ABSTRACT

In some implementations, a data partner may transmit a first request associated with a user account and may receive a first response including an access token. The data partner may transmit a second request, that includes the access token, for a list of applications associated with the user account and may receive a second response including the list of applications. The data partner may transmit a third request, that includes the access token, for a list of activities associated with the list of applications and may receive a third response including the list of activities. The data partner may transmit a fourth request, that includes the access token, to unlink a selected application, from the list of applications, from the user account. The data partner may receive an indication that a token associated with the selected application was revoked.

19 Claims, 22 Drawing Sheets

(56) References Cited

U.S. PATENT DOCUMENTS

| 2014/0344247 | A1* | 11/2014 | Procopio | ............... | G06F 16/248 |
| | | | | | 707/722 |
| 2021/0224285 | A1* | 7/2021 | Aravamudan | ........ | G06F 16/335 |
| 2022/0353260 | A1* | 11/2022 | Gupta | ................. | H04W 12/069 |

* cited by examiner

220

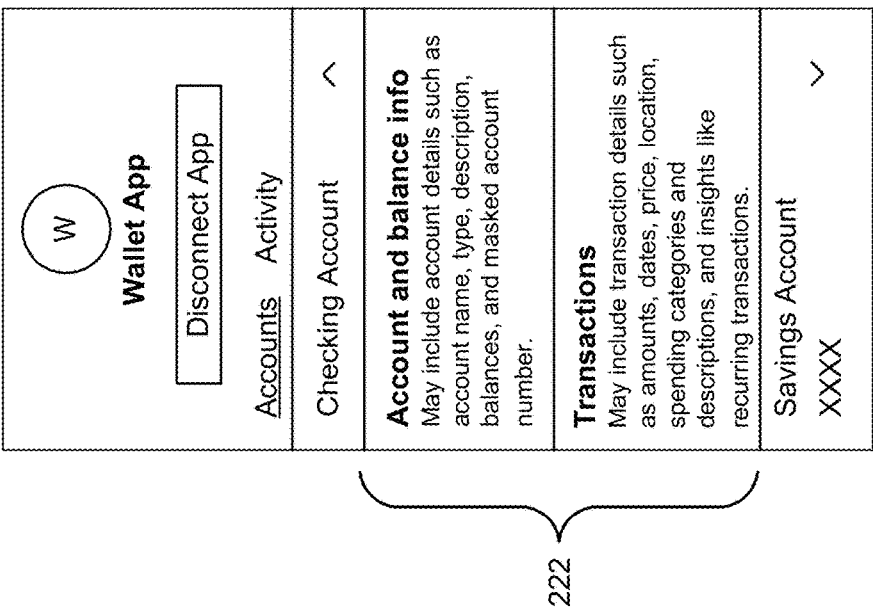

Wallet App

Disconnect App

Accounts    Activity

Checking Account    <

Account and balance info
May include account details such as account name, type, description, balances, and masked account number.

Transactions
May include transaction details such as amounts, dates, price, location, spending categories and descriptions, and insights like recurring transactions.

Savings Account

XXXX    >

Disconnect Wallet App     X

Wallet App accesses your data. If you disconnect from Wallet App, we won't share new data with Wallet App. You can always connect again in the app.

Disconnecting doesn't delete data that Wallet App already has. You can request Wallet App deletes your data by contacting them directly.

Disconnect app

Cancel

232

234

230

Connections

The following apps have access to your data

Apps   Activity

| Connected to Wallet App |
| XX/XX/XXXX x:XX |

| Disconnected from App Name |
| XX/XX/XXXX x:XX |

| Connected to App Name |
| XX/XX/XXXX x:XX |

| Connected to Wallet App |
| XX/XX/XXXX x:XX |

| Disconnected from App Name |
| XX/XX/XXXX x:XX |

| Connected to App Name |
| XX/XX/XXXX x:XX |

App Name

Disconnect app

View the data being
shared with App Name

Accounts    Activity

Activity for App Name not
supported

262

300

320
Deny connection

325
Remove data
already received

Aggregation
system

Data
partner

335
Indication that data
was removed

330a
Rejection

330b
Rejection

Application

User
device

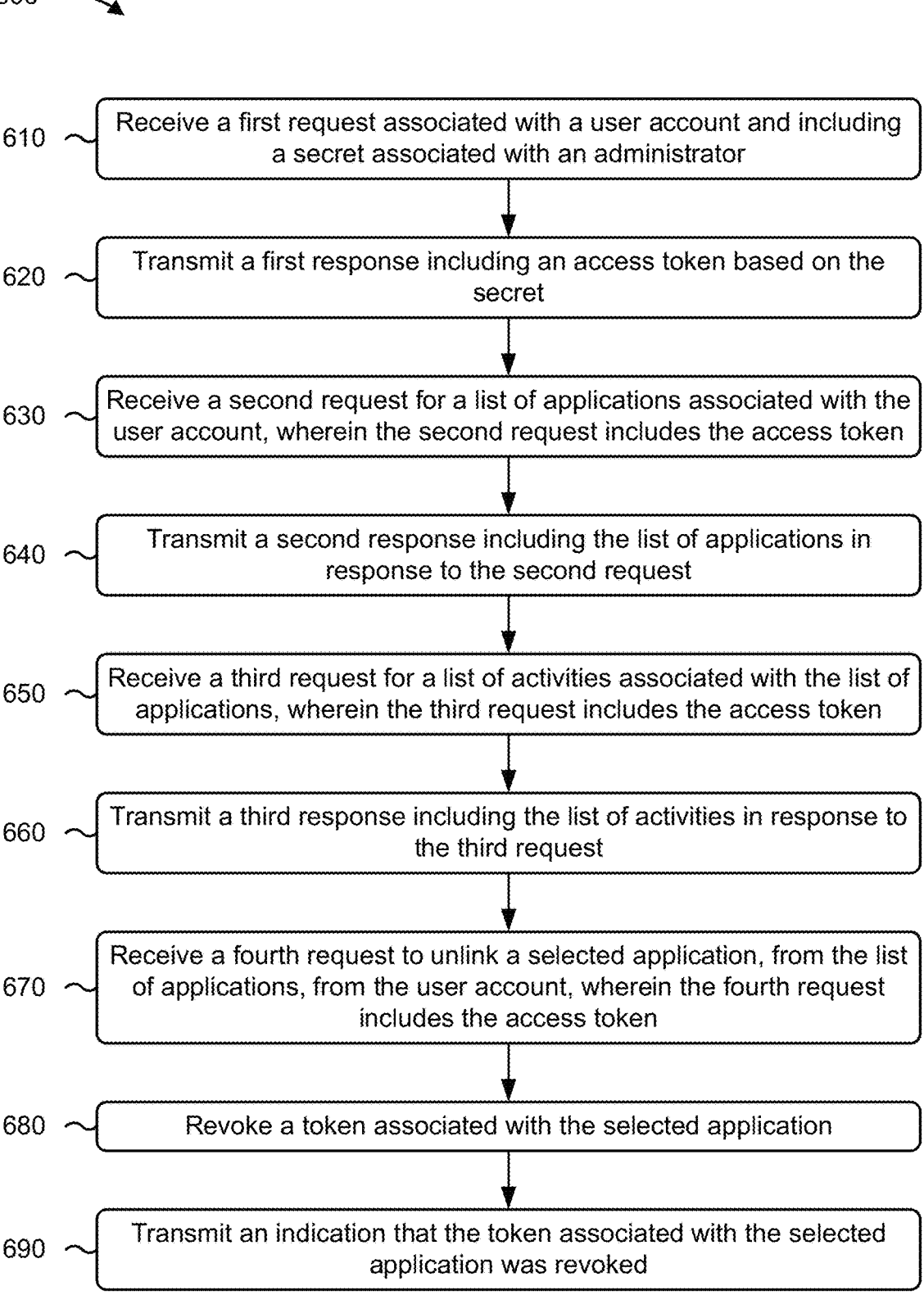

600

610 — Receive a first request associated with a user account and including a secret associated with an administrator 620 — Transmit a first response including an access token based on the secret 630 — Receive a second request for a list of applications associated with the user account, wherein the second request includes the access token 640 — Transmit a second response including the list of applications in response to the second request 650 — Receive a third request for a list of activities associated with the list of applications, wherein the third request includes the access token 660 — Transmit a third response including the list of activities in response to the third request 670 — Receive a fourth request to unlink a selected application, from the list of applications, from the user account, wherein the fourth request includes the access token 680 — Revoke a token associated with the selected application 690 — Transmit an indication that the token associated with the selected application was revoked

FIG. 6

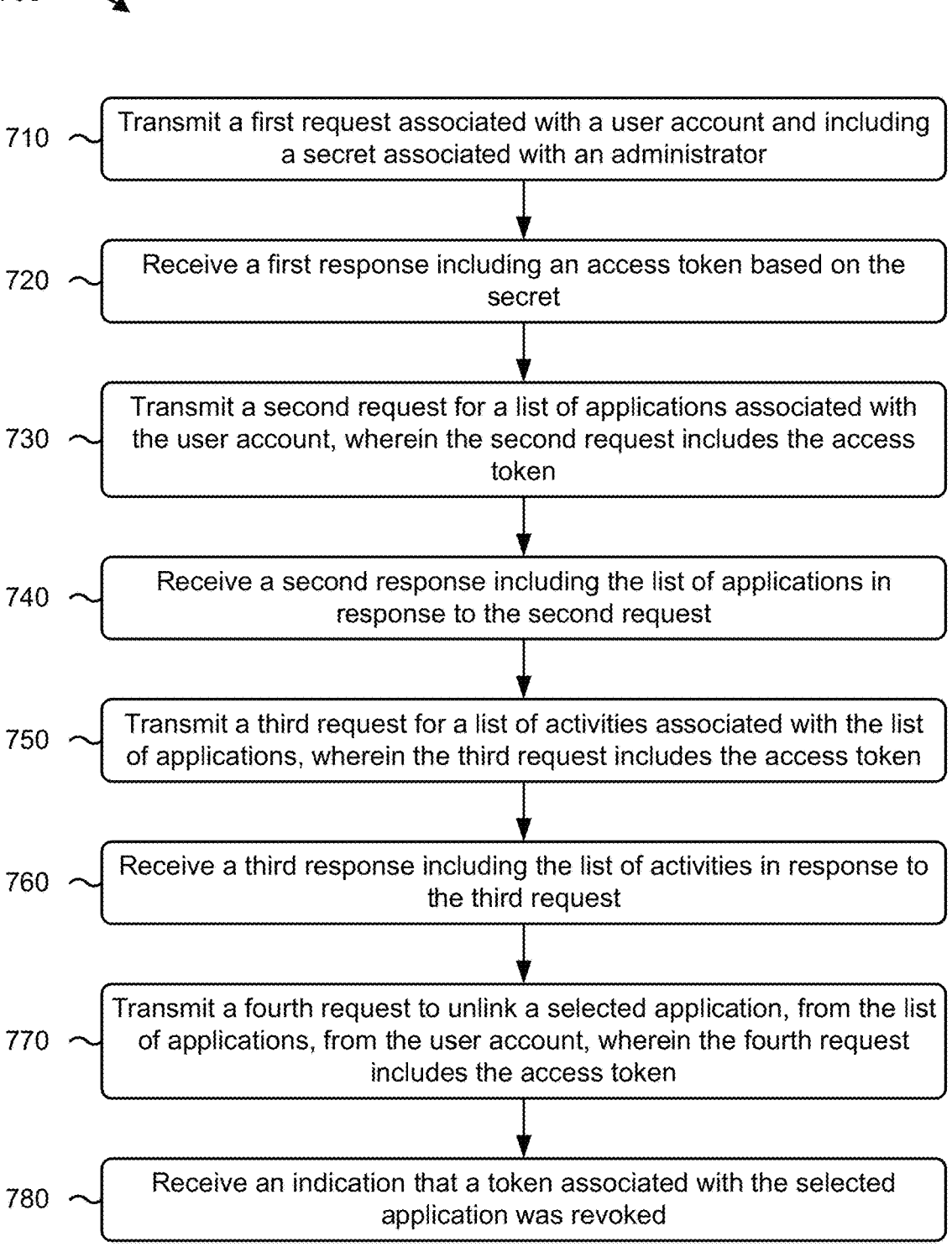

700

710 — Transmit a first request associated with a user account and including a secret associated with an administrator 720 — Receive a first response including an access token based on the secret 730 — Transmit a second request for a list of applications associated with the user account, wherein the second request includes the access token 740 — Receive a second response including the list of applications in response to the second request 750 — Transmit a third request for a list of activities associated with the list of applications, wherein the third request includes the access token 760 — Receive a third response including the list of activities in response to the third request 770 — Transmit a fourth request to unlink a selected application, from the list of applications, from the user account, wherein the fourth request includes the access token 780 — Receive an indication that a token associated with the selected application was revoked

FIG. 7

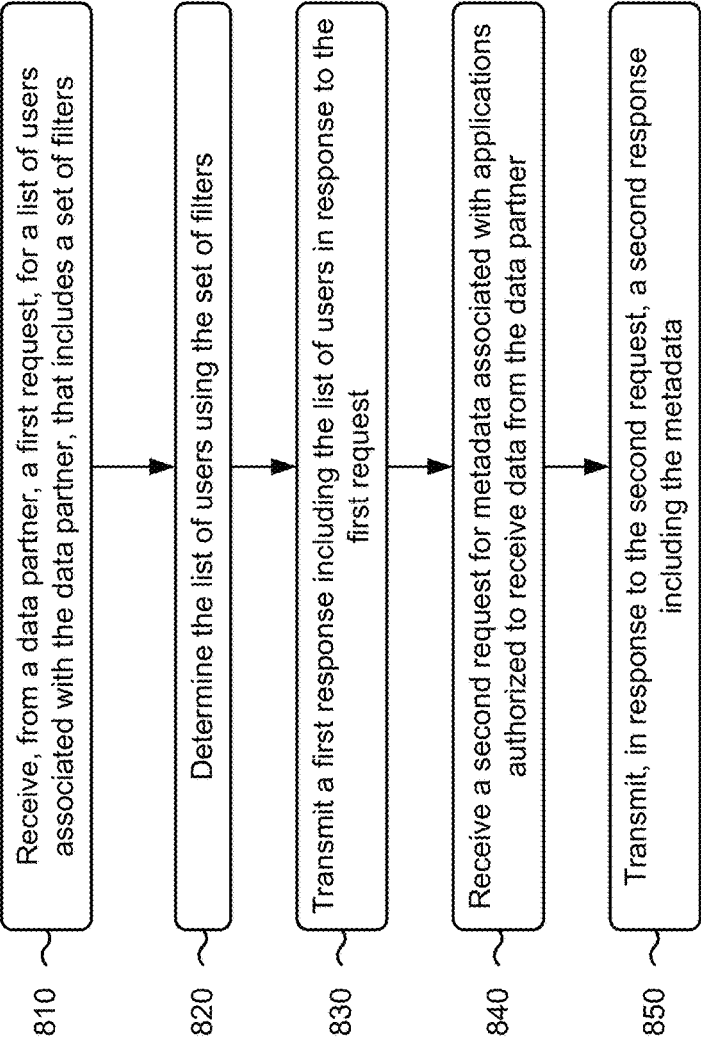

800

810   Receive, from a data partner, a first request, for a list of users associated with the data partner, that includes a set of filters 820   Determine the list of users using the set of filters 830   Transmit a first response including the list of users in response to the first request 840   Receive a second request for metadata associated with applications authorized to receive data from the data partner 850   Transmit, in response to the second request, a second response including the metadata

FIG. 8

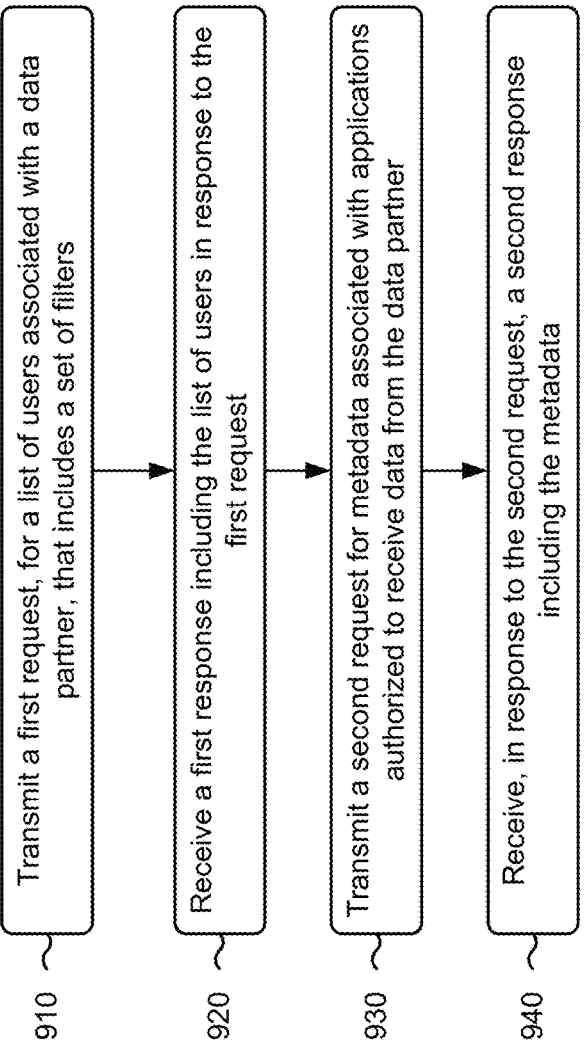

910 Transmit a first request, for a list of users associated with a data partner, that includes a set of filters 920 Receive a first response including the list of users in response to the first request 930 Transmit a second request for metadata associated with applications authorized to receive data from the data partner 940 Receive, in response to the second request, a second response including the metadata

UNLINKING ACCOUNTS FROM APPLICATIONS

RELATED APPLICATION

This application claims priority to U.S. Provisional Patent Application No. 63/502,311, filed May 15, 2023, which is incorporated herein by reference in its entirety.

BACKGROUND

Data aggregators may gather data from multiple data partners and distribute that data to multiple applications. For example, a user may authorize an aggregator to access information from a data provider, associated with an account of the user, for distribution to an application or multiple applications.

SUMMARY

Some implementations described herein relate to a system for unlinking accounts for applications. The system may include one or more memories and one or more processors communicatively coupled to the one or more memories. The one or more processors may be configured to receive a first request associated with a user account and including a secret associated with an administrator. The one or more processors may be configured to transmit a first response including an access token based on the secret. The one or more processors may be configured to receive a second request for a list of applications associated with the user account, wherein the second request includes the access token. The one or more processors may be configured to transmit a second response including the list of applications in response to the second request. The one or more processors may be configured to receive a third request for a list of activities associated with the list of applications, wherein the third request includes the access token. The one or more processors may be configured to transmit a third response including the list of activities in response to the third request. The one or more processors may be configured to receive a fourth request to unlink a selected application, from the list of applications, from the user account, wherein the fourth request includes the access token. The one or more processors may be configured to revoke a token associated with the selected application. The one or more processors may be configured to transmit an indication that the token associated with the selected application was revoked.

Some implementations described herein relate to a method of unlinking accounts for applications. The method may include transmitting a first request associated with a user account and including a secret associated with an administrator. The method may include receiving a first response including an access token based on the secret. The method may include transmitting a second request for a list of applications associated with the user account, wherein the second request includes the access token. The method may include receiving a second response including the list of applications in response to the second request. The method may include transmitting a third request for a list of activities associated with the list of applications, wherein the third request includes the access token. The method may include receiving a third response including the list of activities in response to the third request. The method may include transmitting a fourth request to unlink a selected application, from the list of applications, from the user account, wherein the fourth request includes the access token. The method may include receiving an indication that a token associated with the selected application was revoked.

Some implementations described herein relate to a non-transitory computer-readable medium that stores a set of instructions. The set of instructions, when executed by one or more processors of a device, may cause the device to receive a first request associated with a user account and including a secret associated with an administrator. The set of instructions, when executed by one or more processors of the device, may cause the device to transmit a first response including an access token based on the secret. The set of instructions, when executed by one or more processors of the device, may cause the device to receive a second request for a list of applications associated with the user account, wherein the second request includes the access token. The set of instructions, when executed by one or more processors of the device, may cause the device to transmit a second response including the list of applications in response to the second request. The set of instructions, when executed by one or more processors of the device, may cause the device to receive a third request for a list of activities associated with the list of applications, wherein the third request includes the access token. The set of instructions, when executed by one or more processors of the device, may cause the device to transmit a third response including the list of activities in response to the third request.

Some implementations described herein relate to a system for verifying connections with a data partner. The system may include one or more memories and one or more processors communicatively coupled to the one or more memories. The one or more processors may be configured to receive, from the data partner, a first request for a list of users associated with the data partner, wherein the first request includes a set of filters. The one or more processors may be configured to transmit a first response including the list of users, based on the set of filters, in response to the first request. The one or more processors may be configured to receive a second request for metadata associated with applications authorized to receive data from the data partner. The one or more processors may be configured to transmit, in response to the second request, a second response including the metadata.

Some implementations described herein relate to a method of verifying connections with a data partner. The method may include transmitting, from the data partner, a first request for a list of users associated with the data partner, wherein the first request includes a set of filters. The method may include receiving, at the data partner, a first response including the list of users, based on the set of filters, in response to the first request. The method may include transmitting, to the data partner, a second request for metadata associated with applications authorized to receive data from the data partner. The method may include receiving, in response to the second request, a second response including the metadata.

Some implementations described herein relate to a non-transitory computer-readable medium that stores a set of instructions. The set of instructions, when executed by one or more processors of a device, may cause the device to receive, from a data partner, a first request for a list of users associated with the data partner, wherein the first request includes a set of filters. The set of instructions, when executed by one or more processors of the device, may cause the device to determine the list of users using the set of filters. The set of instructions, when executed by one or more processors of the device, may cause the device to transmit a first response including the list of users in response to the first request. The set of instructions, when executed by one or more processors of the device, may cause the device to receive a second request for a list of applications authorized to receive data from the data partner. The set of instructions, when executed by one or more processors of the device, may cause the device to transmit a second response including the list of applications in response to the second request.

BRIEF DESCRIPTION OF THE DRAWINGS

FIGS. 2A-2G are diagrams of example user interfaces.

FIGS. 6 and 7 are flowcharts of example processes relating to unlinking accounts from applications.

FIGS. 8 and 9 are flowcharts of example processes relating to verifying connections with a data partner.

DETAILED DESCRIPTION

The following detailed description of example implementations refers to the accompanying drawings. The same reference numbers in different drawings may identify the same or similar elements.

A user may have an account with a data partner (e.g., a server, a website, and/or a cloud service, among other examples). Accordingly, the data partner may store information associated with the user (and/or with the account). Applications (e.g., web-based applications and/or mobile applications or "apps," among other examples) may request the information stored at the data partner in order to perform processes for the user (e.g., providing a recommendation to the user or generating a visual representation of the information for the user, among other examples). The user may install and interact with multiple applications, all of which request the information stored at the data partner. In order to reduce power, processing resources, and network resources expended on authorizing multiple applications to access the information from the data partner, a data aggregator may request and cache the information from the data partner for distribution to the applications.

However, because the data aggregator is external, the data partner is not aware of which applications are accessing the information from the data partner. Therefore, the user expends additional power, processing resources, and network resources in creating and using a new set of credentials with the data aggregator in order to manage authorizations of applications that can access the information from the data partner via the data aggregator.

Some implementations described herein enable a data partner to access a list of applications that are authorized to receive and use information, associated with a user account managed by the data partner, via an aggregation system. As a result, a user (e.g., via a user device) may access the list of applications from the data partner, thus conserving power, processing resources, and network resources that would otherwise be expended in creating and using a set of credentials with the aggregation system. Additionally, the user may unlink an application from the data partner rather than having to separately access the aggregation system to do so. In some implementations, the data partner may additionally access, and provide to the user, a list of activities associated with the list of applications and/or a list of most recent access times associated with the list of applications.

FIGS. 1A-1E are diagrams of an example 100 associated with unlinking accounts from applications. As shown in FIGS. 1A-1E, example 100 includes a user device, a data partner, an aggregation system, and an application. These devices are described in more detail in connection with FIGS. 4 and 5.

Figure 1A:
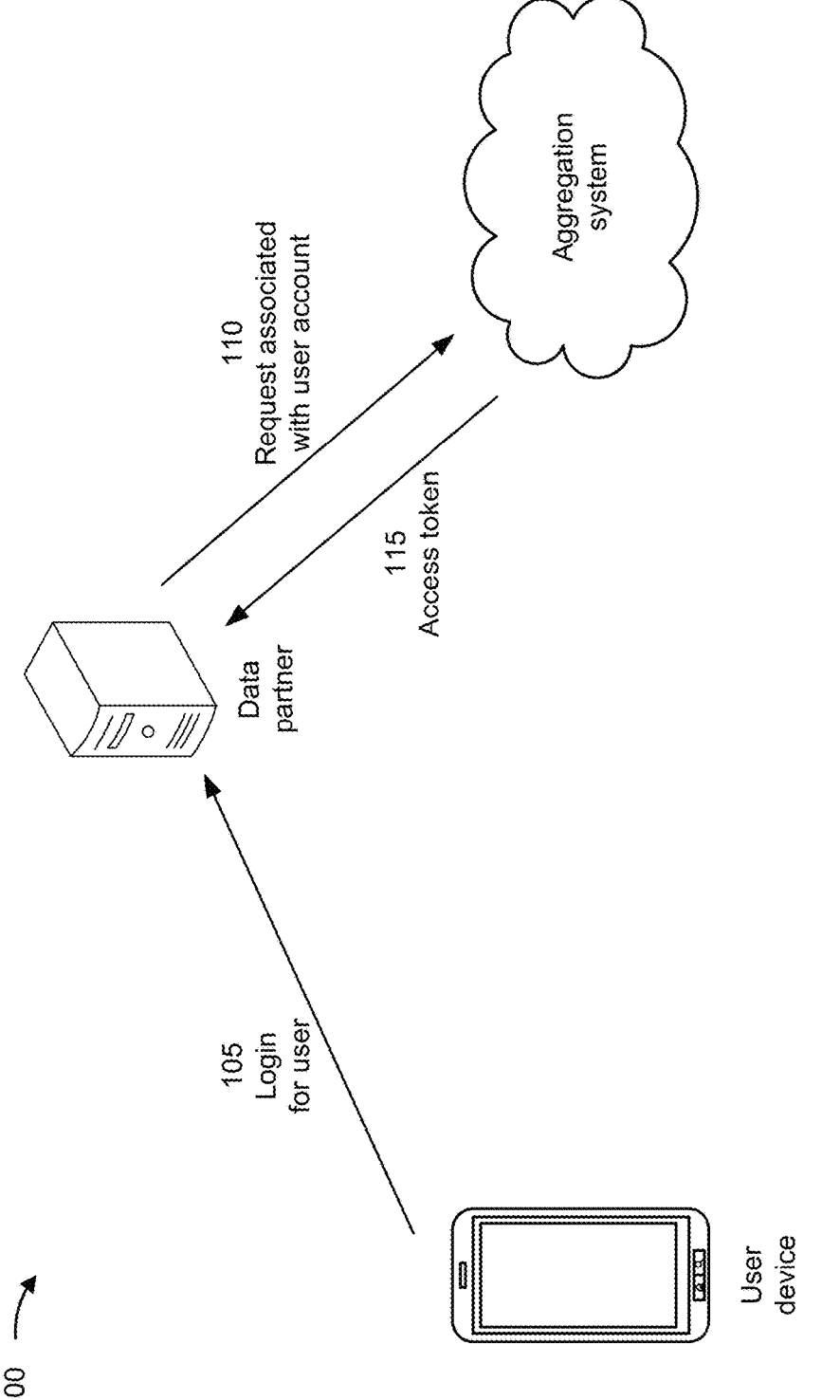
FIGS. 1A-1E are diagrams of an example implementation relating to unlinking accounts from applications.

As shown in FIG. 1A and by reference number 105, the user device may transmit, and the data partner may receive, a request to login associated with a user (of the user device). The request may include a hypertext transfer protocol (HTTP) request and/or an application programming interface (API) call, among other examples. The request may include a set of credentials associated with the user (e.g., a username and password, a passcode, a secret, and/or biometric information, among other examples).

In some implementations, the user may access a website or a mobile app managed by, or at least associated with, the data partner. Accordingly, the user device may generate a user interface (UI) (e.g., using a web browser or another type of application executed by the user device), and the user may interact (e.g., using a touchscreen, a mouse, a microphone, or another type or input component) with the UI (e.g., output via a screen, a speaker, or another type of output component) in order to trigger the user device to transmit the request. Therefore, the data partner may authenticate the user based on the set of credentials and may provide instructions for a UI to the user device (e.g., a UI associated with a homepage or a homescreen for authenticated users).

As shown by reference number 110, the data partner may transmit, and the aggregation system may receive, a request associated with a user account. The user account may be owned, or at least associated with, the user that logged in. Accordingly, the data partner may transmit the request associated with the user account in response to the data partner authenticating the set of credentials from the user device. Additionally, or alternatively, the data partner may transmit the request associated with the user account periodically (e.g., according to a schedule) and/or upon request from an administrator associated with the data partner.

The request associated with the user account may include an API call. For example, the data partner may use an/item/import endpoint to transmit the request associated with the user account. The request may include an identifier associated with the data partner (e.g., a client_id parameter), a secret associated with the data partner (e.g., a secret parameter), and/or an identifier associated with the user account (e.g., a user_id parameter). The secret may be a certificate or another type of data structure that is uniquely (relative to the aggregation system) associated with the data partner. The identifier of the user account may be a persistent identifier (e.g., a username, an email address, or an account number, rather than a session name or an Internet protocol (IP) address). Additionally, the identifier of the user account may be unique (e.g., no other user account managed by the data partner is associated with the same identifier).

As shown by reference number 115, the aggregation system may transmit, and the data partner may receive, a response including an access token. The aggregation system may generate the token based on the secret included in the request. Additionally, the aggregation system may generate the token based on the user account. Accordingly, the access token is unique to the user account such that the aggregation system accepts API calls that include the access token and are associated with the user account but refrains from accepting API calls that include the access token but are associated with other user accounts.

In some implementations, the response may include the access token (e.g., in an access_token parameter) as well as an identifier associated with the request (e.g., a request_id parameter). The access token may be stored by the data partner (e.g., for use in future API calls, as described below). Additionally, the identifier associated with the request may be stored by the data partner (e.g., for use in troubleshooting any errors with the aggregation system). The data partner may store the access token and/or the identifier associated with the request in a local storage (e.g., a memory controlled by the data partner) or in a storage that is at least partially external (e.g., physically, logically, and/or virtually) to the data partner.

Figure 1B:
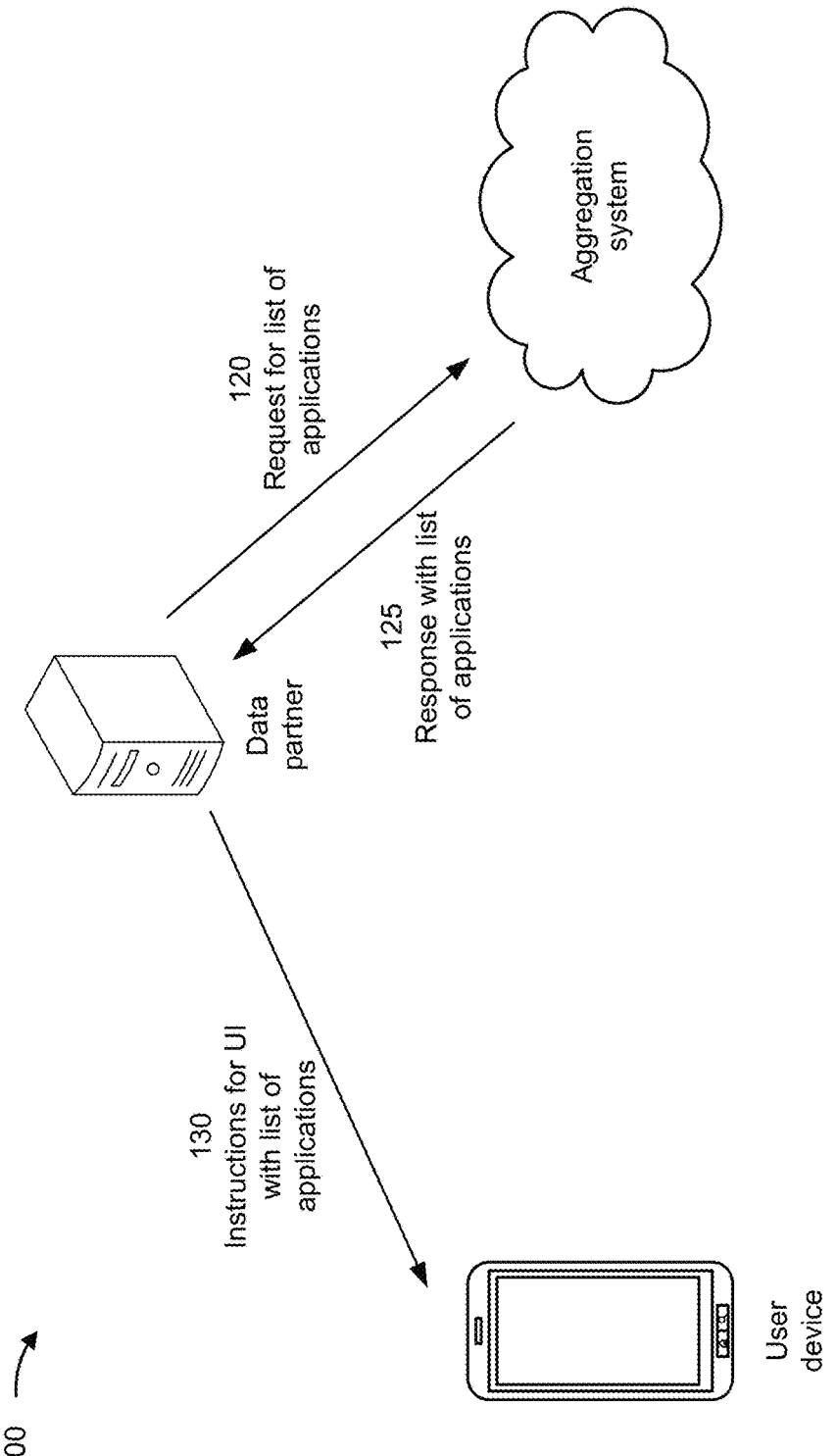

As shown in FIG. 1B and by reference number 120, the data partner may transmit, and the aggregation system may receive, a request for a list of applications associated with the user account. The data partner may transmit the request for the list of applications in response to the data partner authenticating the set of credentials from the user device. Additionally, or alternatively, the data partner may transmit the request for the list of applications periodically (e.g., according to a schedule), upon request from an administrator associated with the data partner, and/or in response to the user device indicating an interaction with the UI associated with the homepage or the homescreen, as described above.

The request associated with the user account may include an API call. For example, the data partner may use an/item/ application/list endpoint to transmit the request associated with the user account. The request may include the identifier associated with the data partner (e.g., the client_id parameter), the secret associated with the data partner (e.g., the secret parameter), and/or the access token (e.g., the access_token parameter). The access token may therefore indicate the user account for which the list of applications should be returned (because the access token is unique to the user account).

As shown by reference number 125, the aggregation system may transmit, and the data partner may receive, a response including the list of applications. The aggregation system may transmit the response with the list of applications in response to the request for the list of applications. For example, the aggregation system may decode the access token to validate the access token and determine the user account. Accordingly, the aggregation system may identify the list of applications associated with the user account to indicate in the response.

In some implementations, the response may include, for each application in the list, an identifier of the application (e.g., an application_id parameter), a link associated with the application (e.g., a uniform resource locator (URL) of a website associated with the application included in an application_url parameter), a name of the application (e.g., a human-readable name in a display_name parameter), a link to a logo associated with the application (e.g., a logo_url parameter that may be a URL of an image of the logo), a reason associated with the application accessing information associated with the user account (e.g., a reason_for_access parameter), a datetime associated with connection of the application to the user account (e.g., in a standardized format, such as according to the International Organization for Standardization (ISO) 8601 standards, and in a created_at parameter), and a list of products that are accessible by the application (e.g., a set of Boolean parameters such as identity, statements, auth, or transactions). In some implementations, the user account may be associated with a plurality of accounts (in other words, there may be a plurality of accounts within the user account), and the response may further include a list of accounts that are accessible by the application (e.g., using an account identifier such as unique_id for each account). Additionally, the response may indicate whether the application has automatic access to new accounts opened within the user account (e.g., using a Boolean or another type of binary data structure included in a new_accounts parameter). In some implementations, the response may further include an identifier associated with the request (e.g., a request_id parameter). The identifier associated with the request may be stored by the data partner (e.g., for use in troubleshooting any errors with the aggregation system). The data partner may store the identifier associated with the request in a local storage (e.g., a memory controlled by the data partner) or in a storage that is at least partially external (e.g., physically, logically, and/or virtually) to the data partner.

As shown by reference number 130, the data partner may transmit, and the user device may receive, instructions for a UI that includes the list of applications. For example, the UI may be as described below in connection with FIG. 2A.

Figure 1C:
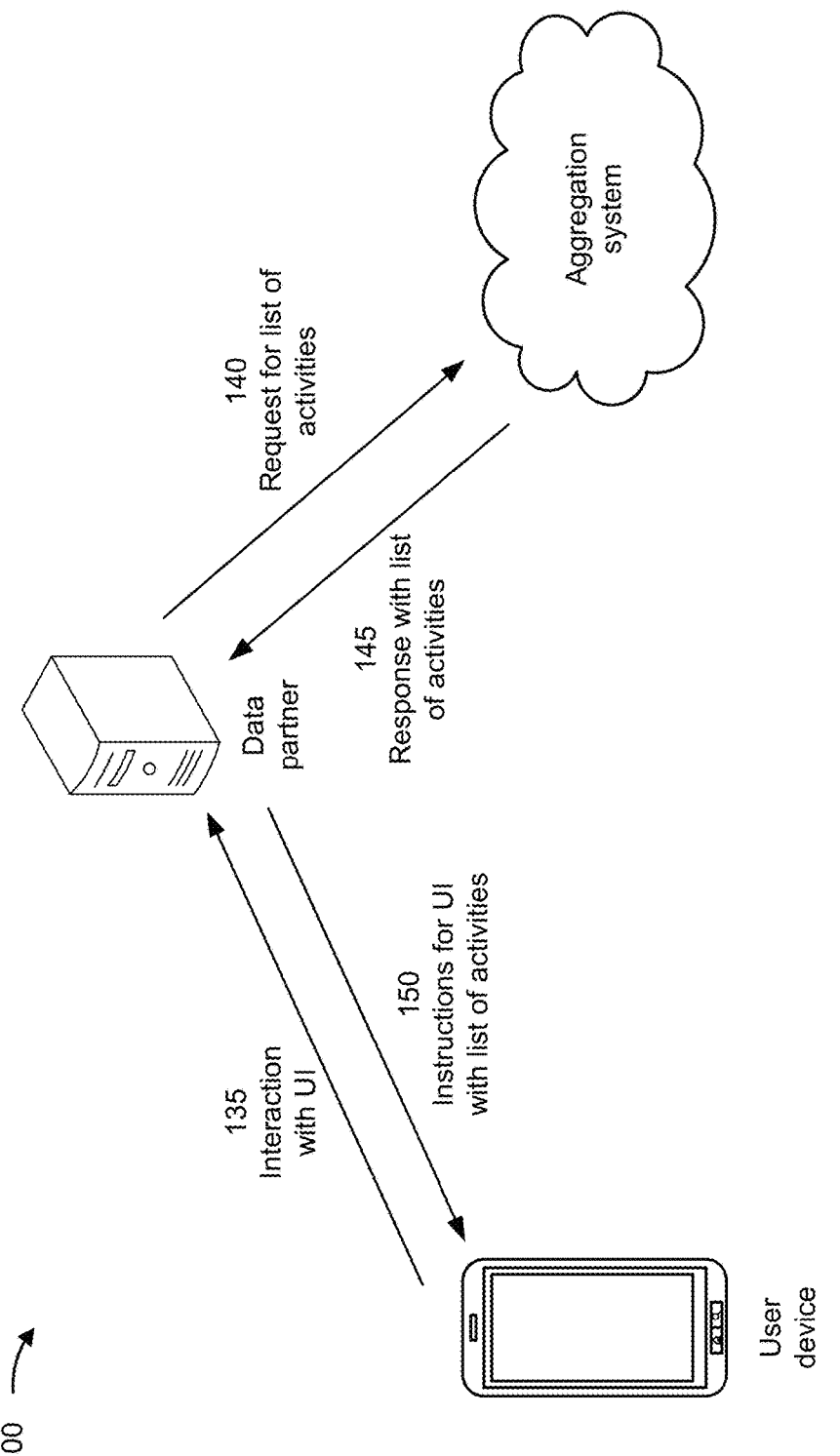
Figure 2A:
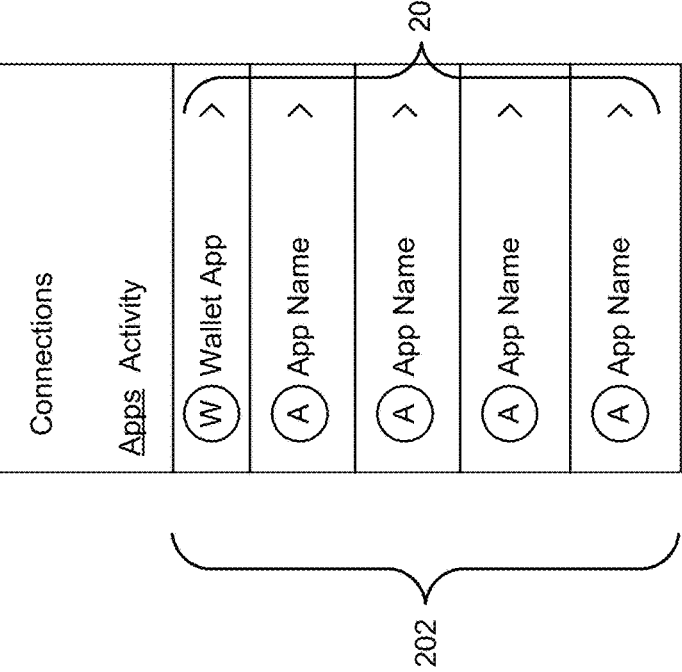

As shown in FIG. 1C and by reference number 135, the user device may transmit, and the data partner may receive, an indication of an interaction (e.g., a click, a tap, or a spoken command, among other examples) with a UI (e.g., the UI that includes the list of applications or the UI associated with the homepage or the homescreen for authenticated users, among other examples). The interaction may be associated with viewing a list of activities (e.g., selecting the "Activity" tab as shown in FIG. 2A).

As shown by reference number 140, the data partner may transmit, and the aggregation system may receive, a request for a list of activities associated with the list of applications. The data partner may transmit the request for the list of applications in response to the indication of the interaction, as described in connection with reference number 135. Additionally, or alternatively, the data partner may transmit the request for the list of activities periodically (e.g., according to a schedule) and/or upon request from an administrator associated with the data partner.

The request for the list of activities may include an API call. For example, the data partner may use an/item/activity/ list endpoint to transmit the request associated with the user account. The request may include the identifier associated with the data partner (e.g., the client_id parameter), the secret associated with the data partner (e.g., the secret parameter), and/or the access token (e.g., the access_token parameter). The access token may therefore indicate the user account for which the list of activities should be returned (because the access token is unique to the user account).

As shown by reference number 145, the aggregation system may transmit, and the data partner may receive, a response including the list of activities. The aggregation system may transmit the response with the list of activities in response to the request for the list of activities. For example, the aggregation system may decode the access token to validate the access token and determine the user account. Accordingly, the aggregation system may identify the list of activities associated with the user account to indicate in the response. In some implementations, the response may further include a list of most recent access times associated with the list of applications. Each most recent access time may be associated with an account within the user account (e.g., as described above in connection with reference number 125). A most recent access time may be recorded by the aggregation system when the application accesses information associated with the account.

In some implementations, the response may include, for each activity in the list, an identifier of the application associated with the activity (e.g., a target_application_id parameter), an identifier of where the activity was initiated (e.g., an initiator parameter), a status associated with the activity (e.g., a state parameter), a datetime associated with the activity (e.g., an initiated_date parameter), an identifier associated with the activity (e.g., an id parameter), and a category associated with the activity (e.g., an activity parameter selected from an enumerated list, such as ITEM_CRE-ATE, ITEM_UNLINK, or ITEM_REMOVE). For the list of most recent access times, the response may include, for each application in the list of applications, a datetime associated with a most recent access of the user account. In implementations where the user account is associated with a plurality of accounts, the response may include, for each application and each account, a datetime associated with most recent access. In some implementations, the response may further include an identifier associated with the request (e.g., a request_id parameter). The identifier associated with the request may be stored by the data partner (e.g., for use in troubleshooting any errors with the aggregation system). The data partner may store the identifier associated with the request in a local storage (e.g., a memory controlled by the data partner) or in a storage that is at least partially external (e.g., physically, logically, and/or virtually) to the data partner.

As shown by reference number 150, the data partner may transmit, and the user device may receive, instructions for a UI that includes the list of activities. For example, the UI may be as described in connection with FIG. 2E.

Figure 1D:
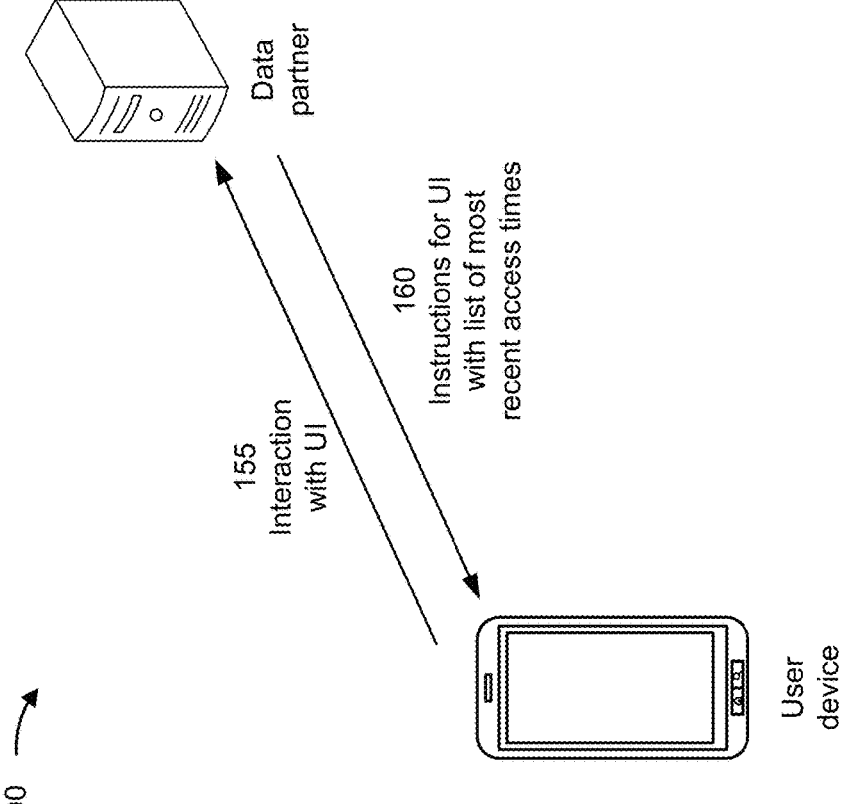
Figure 2B:
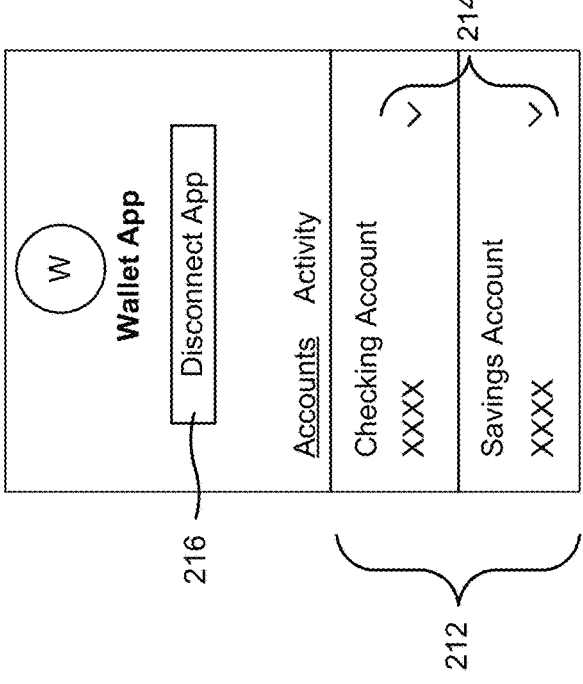

As shown in FIG. 1D and by reference number 155, the user device may transmit, and the data partner may receive, an indication of an interaction (e.g., a click, a tap, or a spoken command, among other examples) with a UI (e.g., the UI that includes the list of applications or the UI that includes the list of activities, or the UI associated with the homepage or the homescreen for authenticated users, among other examples). The interaction may be associated with viewing a list of most recent access times (e.g., selecting the "Activity" tab as shown in FIGS. 2B-2C).

As shown by reference number 160, the data partner may transmit, and the user device may receive, instructions for a UI that includes the list of most recent access times. For example, the UI may be as described in connection with FIG. 2F. In some implementations, the aggregation system may return a null value when the most recent access times are not available, such that the UI may be as described in connection with FIG. 2G.

Figure 1E:
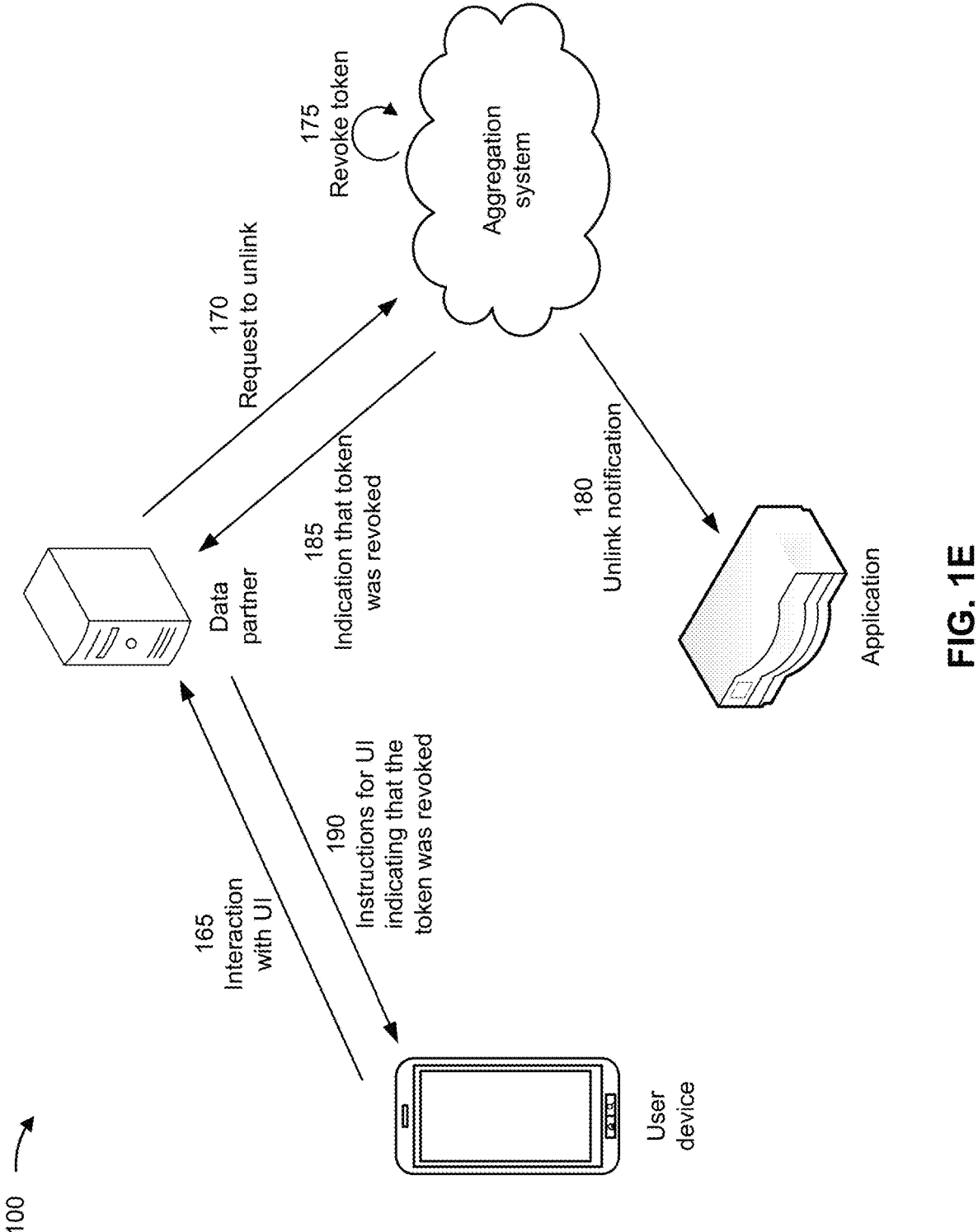

As shown in FIG. 1E and by reference number 165, the user device may transmit, and the data partner may receive, an indication of an interaction (e.g., a click, a tap, or a spoken command, among other examples) with a UI (e.g., a UI that includes an element associated with unlinking an application, as described in connection with FIGS. 2B and 2F, among other examples). The interaction may be associated with unlinking a selected application in the list of applications.

As shown by reference number 170, the data partner may transmit, and the aggregation system may receive, a request to unlink the selected application. The data partner may transmit the request to unlink the selected application in response to the indication of the interaction, as described in connection with reference number 165.

The request to unlink the selected application may include an API call. For example, the data partner may use an/item/application/unlink endpoint to transmit the request. The request may include the identifier associated with the data partner (e.g., the client_id parameter), the secret associated with the data partner (e.g., the secret parameter), the access token (e.g., the access_token parameter), and an identifier associated with the selected application (e.g., an application_id parameter). The identifier associated with the selected application is the same identifier that was included in the response(s) described above from the aggregation system.

As shown by reference number 175, the aggregation system may revoke a token associated with the selected application. For example, the aggregation system may indicate that the token is expired such that future requests, from the selected application and for information associated with the user account, are denied by the aggregation system based on expiry of the token. Although the example 100 is described in connection with a single token, other examples may include the aggregation system revoking a plurality of tokens associated with the selected application. For example, the selected application may use the plurality of tokens to access information associated with a plurality of accounts within the user account. In some implementations, as shown by reference number 180, the aggregation system may additionally notify the application that the token has been revoked. For example, the aggregation system may use a webhook to indicate to the application that an update is available, and the application may respond to the webhook to receive an indication that the token has been revoked.

As shown by reference number 185, the aggregation system may transmit, and the data partner may receive, an indication that the token associated with the selected application was revoked. For example, the indication may include an HTTP 200 OK response code.

Additionally, in some implementations, the response may include an identifier associated with the request (e.g., a request_id parameter). The identifier associated with the request may be stored by the data partner (e.g., for use in troubleshooting any errors with the aggregation system). The data partner may store the identifier associated with the request in a local storage (e.g., a memory controlled by the data partner) or in a storage that is at least partially external (e.g., physically, logically, and/or virtually) to the data partner.

As shown by reference number 190, the data partner may transmit, and the user device may receive, instructions for a UI that indicates that the token associated with the selected application was revoked. For example, the UI may be a pop-up window or a push notification, among other examples.

By using techniques as described in connection with FIGS. 1A-IE, the data partner may access the list of applications that are authorized to receive and use information, associated with the user account, via the aggregation system. As a result, the user of the user device may access the list of applications from the data partner, thus conserving power, processing resources, and network resources that would otherwise be expended in creating and using a set of credentials with the aggregation system. Additionally, the user may unlink a selected application from the data partner rather than having to separately access the aggregation system to do so. Furthermore, the data partner may additionally access, and provide to the user, the list of activities associated with the list of applications and/or the list of most recent access times associated with the list of applications.

As indicated above, FIGS. 1A-1E are provided as an example. Other examples may differ from what is described with regard to FIGS. 1A-IE.

FIGS. 2A, 2B, 2C, 2D, 2E, 2F, and 2G are diagrams of example Uis 200, 210, 220, 230, 240, 250, and 260, respectively, associated with unlinking accounts from applications. The example Uis 200, 210, 220, 230, 240, 250, and 260 may be displayed at a user device based on instructions from a data partner. These devices are described in more detail in connection with FIGS. 3 and 4.

As shown in FIG. 2A, the example UI 200 includes a list of applications 202 that are associated with a user account (e.g., at an aggregation system). The list of applications 202 may include names, as shown in FIG. 2A. Additionally, in some implementations and as further shown in FIG. 2A, the list of applications 202 may include logos (e.g., retrieved via URLs received from the aggregation system, as described in connection with FIG. 1B). The example UI 200 may further include a set of elements 204. A user of the user device may interact with an element, in the set of elements 204, to receive more information associated with an application, in the list of applications 202, associated with the element. For example, the user device may display a UI similar to the example UI 210 in response to interaction with an element in the set of elements 204.

As shown in FIG. 2B, the example UI 210 includes a list of accounts 212 that are associated with a user account and accessible by an application (e.g., at an aggregation system). The example UI 210 indicates the application via a name ("Wallet App" in FIG. 2B). Additionally, in some implementations and as further shown in FIG. 2B, the example UI 210 may indicate the application via a logo (e.g., retrieved via a URL received from the aggregation system, as described in connection with FIG. 1B). The example UI 210 may further include a set of elements 214. A user of the user device may interact with an element, in the set of elements 214, to receive more information associated with an account, in the list of accounts 212, that is associated with the element. For example, the user device may display a UI similar to the example UI 220 in response to interaction with an element in the set of elements 214. The example UI 210 may further include an element 216 (e.g., a button, as shown in FIG. 2B) that activates an unlinking process for the application (e.g., as described in connection with FIG. 1E).

As shown in FIG. 2C, the example UI 220 is similar to the example UI 210 but includes additional information 222 associated with one account, from a list of accounts, that are associated with a user account and accessible by an application (e.g., at an aggregation system). For example, the additional information 222 may be displayed in response to interaction with an element associated with the account (e.g., from the set of elements 214, as described in connection with FIG. 2B). The additional information 222 may indicate specific data, associated with the account, that is shared with the application (e.g., by the aggregation system).

Figure 2D:
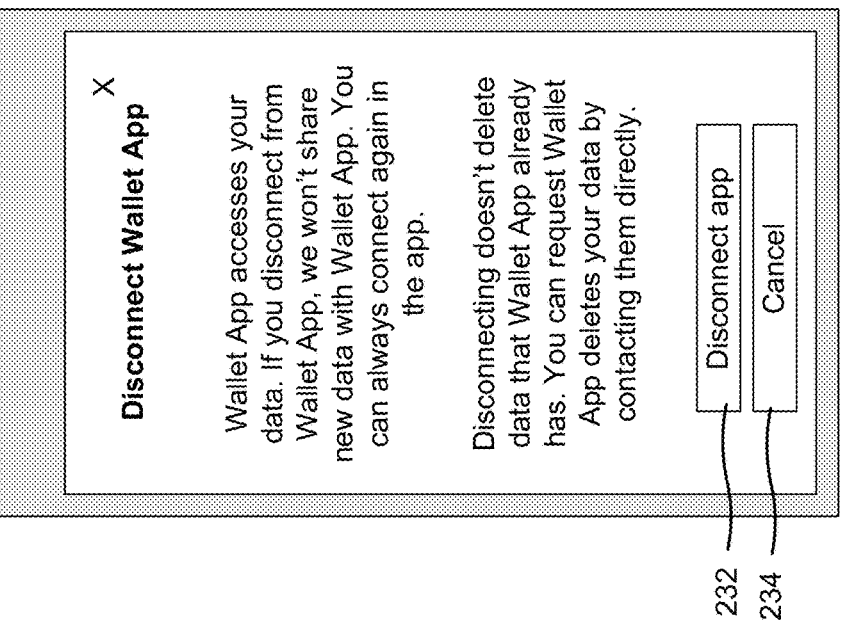

As shown in FIG. 2D, the example UI 230 is associated with unlinking an application from the data provider (e.g., via an aggregation system). For example, the additional information 222 may be displayed in response to interaction with an element associated with unlinking (e.g., the element 216, as described in connection with FIG. 2B, or the element 254, as described in connection with FIG. 2F). The example UI 230 may include an element 232 (e.g., a button, as shown in FIG. 2D) that finalizes an unlinking process for the application (e.g., as described in connection with FIG. 1E). Additionally, the example UI 230 may include an element 234 (e.g., a button, as shown in FIG. 2D) that cancels an unlinking process for the application. In other words, the example UI 230 may function as a confirmation screen before the application is unlinked.

As shown in FIG. 2E, the example UI 240 includes a list of activities 242 that are associated with a user account (e.g., at an aggregation system). The list of activities 242 may be sorted chronically and thus include activities from multiple applications that are authorized to use information associated with the user account (e.g., via the aggregation system).

Figure 2F:
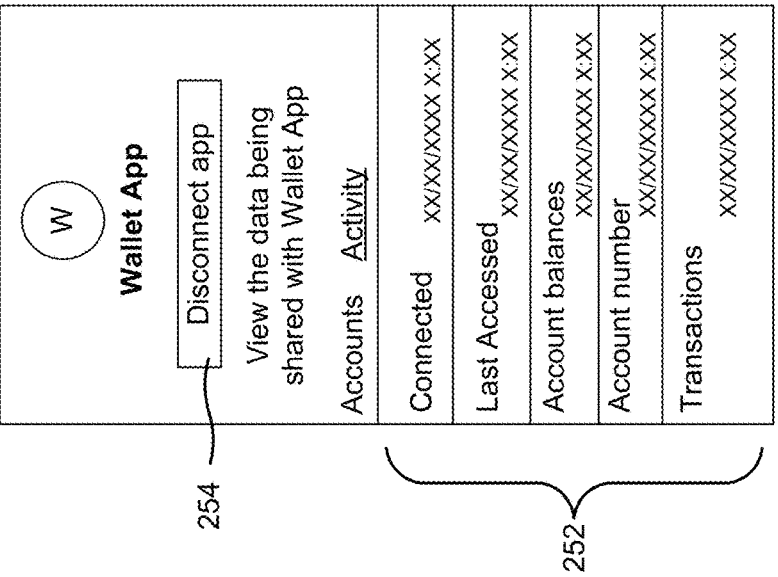

As shown in FIG. 2F, the example UI 250 includes a list of most recent access times 252 that are associated with a user account and an application (e.g., at an aggregation system). The example UI 250 indicates the application via a name ("Wallet App" in FIG. 2F). Additionally, in some implementations and as further shown in FIG. 2F, the example UI 250 may indicate the application via a logo (e.g., retrieved via a URL received from the aggregation system, as described in connection with FIG. 1B). The example UI 250 may further include an element 254 (e.g., a button, as shown in FIG. 2F) that activates an unlinking process for the application (e.g., as described in connection with FIG. 1E).

Figure 2G:
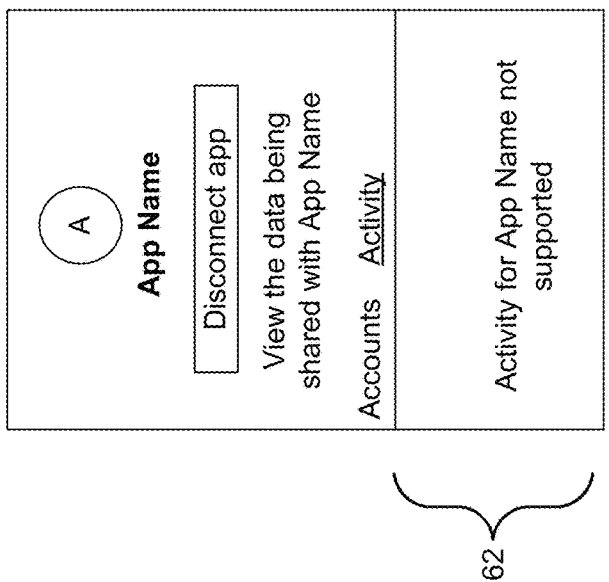

As shown in FIG. 2G, the example UI 260 is similar to the example UI 250 but is for "App Name" rather than "Wallet App." For this application, the data provider does not have access to a list of most recent access times, so an error message 262 is shown instead.

As indicated above, FIGS. 2A-2G are provided as examples. Other examples may differ from what is described with regard to FIGS. 2A-2G.

FIGS. 3A-3D are diagrams of an example 300 associated with verifying connections with a data partner. As shown in FIGS. 3A-3D, example 300 includes a user device, a data partner, an aggregation system, and an application. These devices are described in more detail in connection with FIGS. 4 and 5.

Figure 3A:
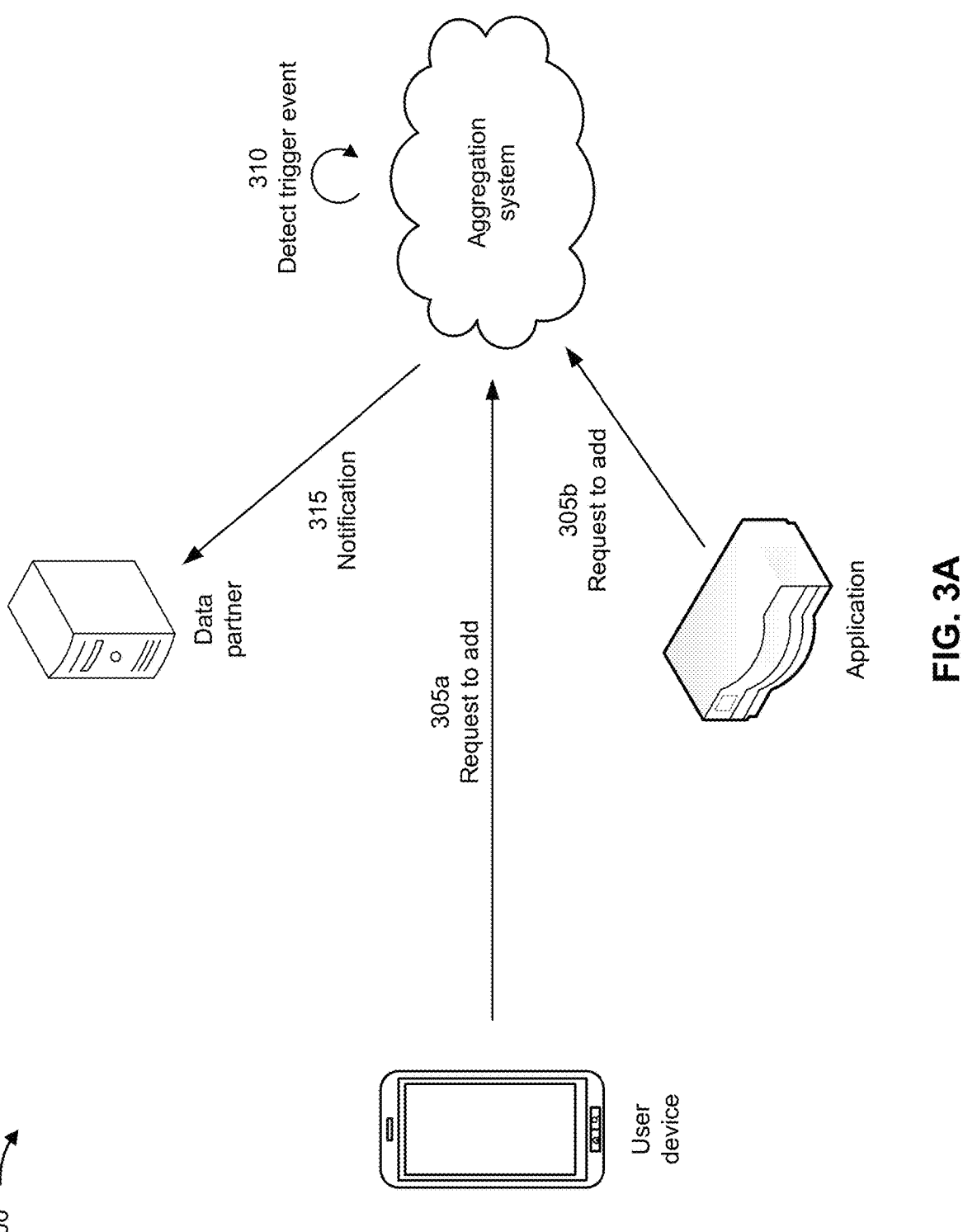
FIGS. 3A-3D are diagrams of an example implementation relating to verifying connections with a data partner.

As shown in FIG. 3A and by reference number 305*a*, the user device may transmit, and the aggregation system may receive, a request to add the application to a user account. The request may include a request for the aggregation system to collect data (e.g., from the data partner), store the data in association with the user account, and provide the application with access to the data (as stored). The request may include an HTTP request and/or an API call. In some implementations, the request may include a set of credentials associated with a user of the user device (e.g., a username and password, a passcode, a secret, and/or biometric information, among other examples). Therefore, the aggregation system may add the application to the user account in response to verifying the set of credentials.

Additionally, or alternatively, as shown by reference number 305*b*, the application may transmit, and the aggregation system may receive, the request to add the application to the user account. Therefore, the application may directly request access to data stored at the aggregation system (e.g., from the data partner) and associated with the user account.

As shown by reference number 310, the aggregation system may detect a trigger event. For example, the trigger event may include receiving the request from the user device and/or the application. Additionally, the request may result in a trigger event based on the application lacking previous access to the user account, to the data partner, and/or to the aggregation system in general. In other words, the aggregation system may refrain from detecting a trigger event when the application re-requests access to data associated with the user account (that had previously been granted but revoked), when the application already has access to data from the data partner and associated with other user accounts at the aggregation system, and/or when the application already has access to the aggregation system for data from other data partners.

As shown by reference number 315, the aggregation system may transmit, and the data partner may receive, a notification of the new connection. For example, the aggregation system may trigger a webhook (e.g., in response to the trigger event) that causes an API function (associated with the aggregation system) to push the notification to the data partner.

Figure 3B:
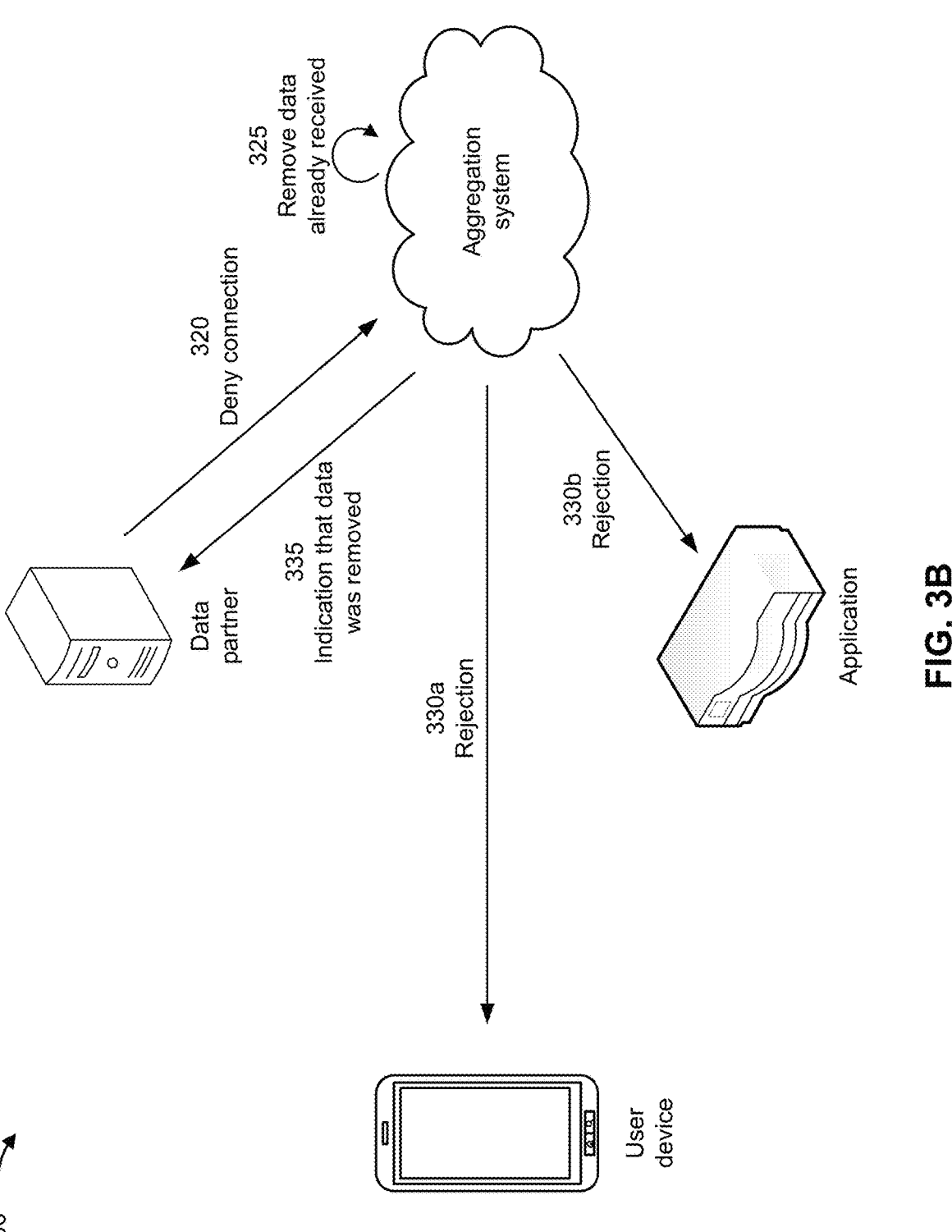

As shown in FIG. 3B and by reference number 320, the data partner may transmit, and the aggregation system may receive, a denial of the new connection. For example, the data partner may transmit, and the aggregation system may receive, the denial based on the notification. The data partner may determine that there are compliance concerns with the application and/or security concerns with the application, among other examples, and may transmit the denial based on the concerns. The denial may be an API call (e.g., triggered by the notification from the webhook).

As shown by reference number 325, the aggregation system may remove data already received and associated with the new connection. For example, the aggregation system may discard the data in response to the denial. Additionally, or alternatively, the aggregation system may refrain from provisioning a token to the application that would have authorized the application to receive the data. In some implementations, the aggregation system may have already provisioned the token. For example, a timer (associated with the notification) may have expired without a response from the data partner, and the aggregation system may have provisioned the token in response to expiry of the timer. Accordingly, if the aggregation system has already provisioned the token, the aggregation system may revoke the token (e.g., as described in connection with FIG. 1E).

As shown by reference number 330a, the aggregation system may transmit, and the user device may receive, a rejection of the request to add the application. For example, the aggregation system may transmit, and the user device may receive, the rejection in response to the request (as described in connection with reference number 305a). Additionally, or alternatively, as shown by reference number 330b, the aggregation system may transmit, and the application may receive, a rejection of the request to add the application. For example, the aggregation system may transmit, and the application may receive, the rejection in response to the request (as described in connection with reference number 305b).

As shown by reference number 335, the aggregation system may transmit, and the data partner may receive, an indication that the data (associated with the new connection) was removed. Accordingly, the data partner may confirm that the data is secure and/or otherwise compliant with one or more regulations.

Figure 3C:
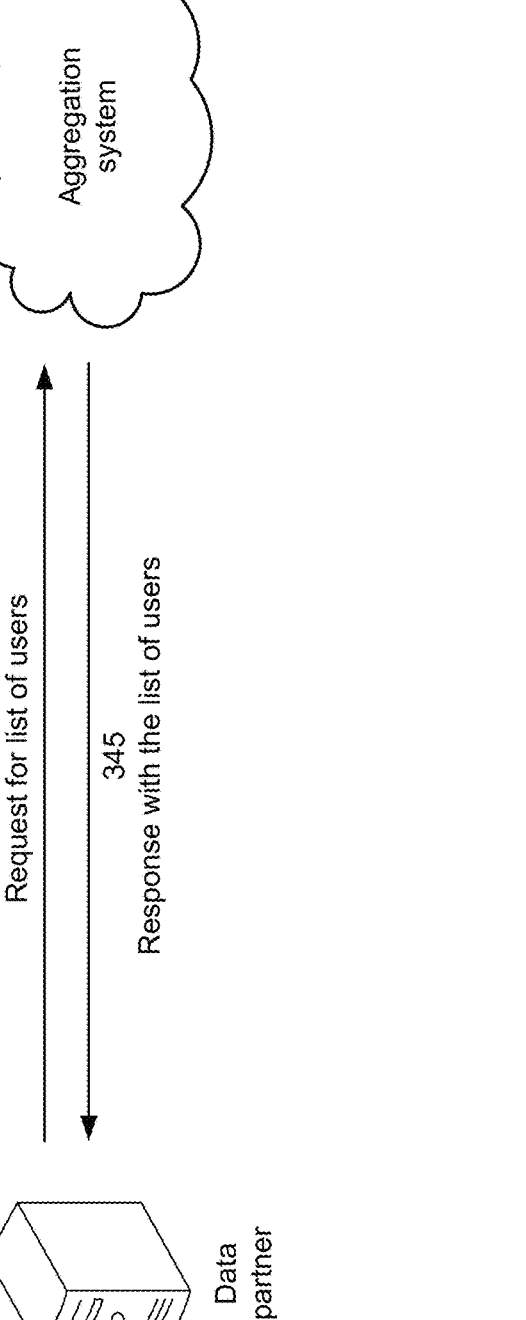

In some implementations, the data partner may request a list of users associated with data accessed from the data partner (and stored at the aggregation system). For example, as shown in FIG. 3C and by reference number 340, the data partner may transmit, and the aggregation system may receive, a request for the list of users. In some implementations, the request for the list of users may include an API call. For example, the data partner may use an /item/import endpoint to transmit the request. The request may include an identifier associated with the data partner (e.g., a client_id parameter) and/or a secret associated with the data partner (e.g., a secret parameter), as described above. Additionally, the request may include a set of filters. For example, the set of filters may include a date range, a permission scope (e.g., a filter to only include users that allow full access to all account information, a filter to only include users that allow access to information associated with more than one account at the data partner, and/or a filter to only include users that disallow access to transaction information, among other examples).

Accordingly, the aggregation system may determine the list of users based on the set of filters. As shown by reference number 345, the aggregation system may transmit, and the data partner may receive, a response including the list of users.

Figure 3D:
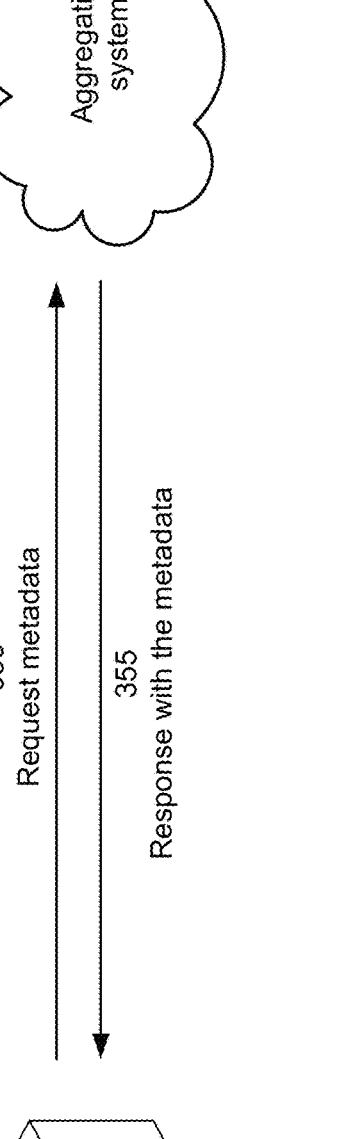

In some implementations, the data partner may request metadata associated with applications that are authorized to access data from the data partner (and stored at the aggregation system). For example, as shown in FIG. 3D and by reference number 350, the data partner may transmit, and the aggregation system may receive, a request for the metadata. The metadata may include a list of applications that are authorized to access data from the data partner, a quantity of users of the data partner that have authorized a particular application, and/or a quantity of accounts, associated with the data partner, having information that is shared with the particular application. In some implementations, the request for the metadata may include an API call. For example, the data partner may use an/item/import endpoint to transmit the request. The request may include an identifier associated with the data partner (e.g., a client_id parameter) and/or a secret associated with the data partner (e.g., a secret parameter), as described above. Additionally, the request may indicate which metadata is requested (e.g., an indication of a particular application and/or whether the data provider is requesting the list of applications, among other examples).

As shown by reference number 355, the aggregation system may transmit, and the data partner may receive, a response including the metadata. In some implementations, the request for the metadata may be a request for a dashboard. Therefore, the aggregation system may transmit, and the data partner may receive, instructions for a UI including the metadata. The UI may include a table with the list of applications that are authorized to access data from the data partner. Additionally, the table may include, for each row corresponding to an application in the list, a quantity of users of the data partner that have authorized the application and/or a quantity of accounts, associated with the data partner, having information that is shared with the application.

As indicated above, FIGS. 3A-3D are provided as an example. Other examples may differ from what is described with regard to FIGS. 3A-3D.

Figure 4:
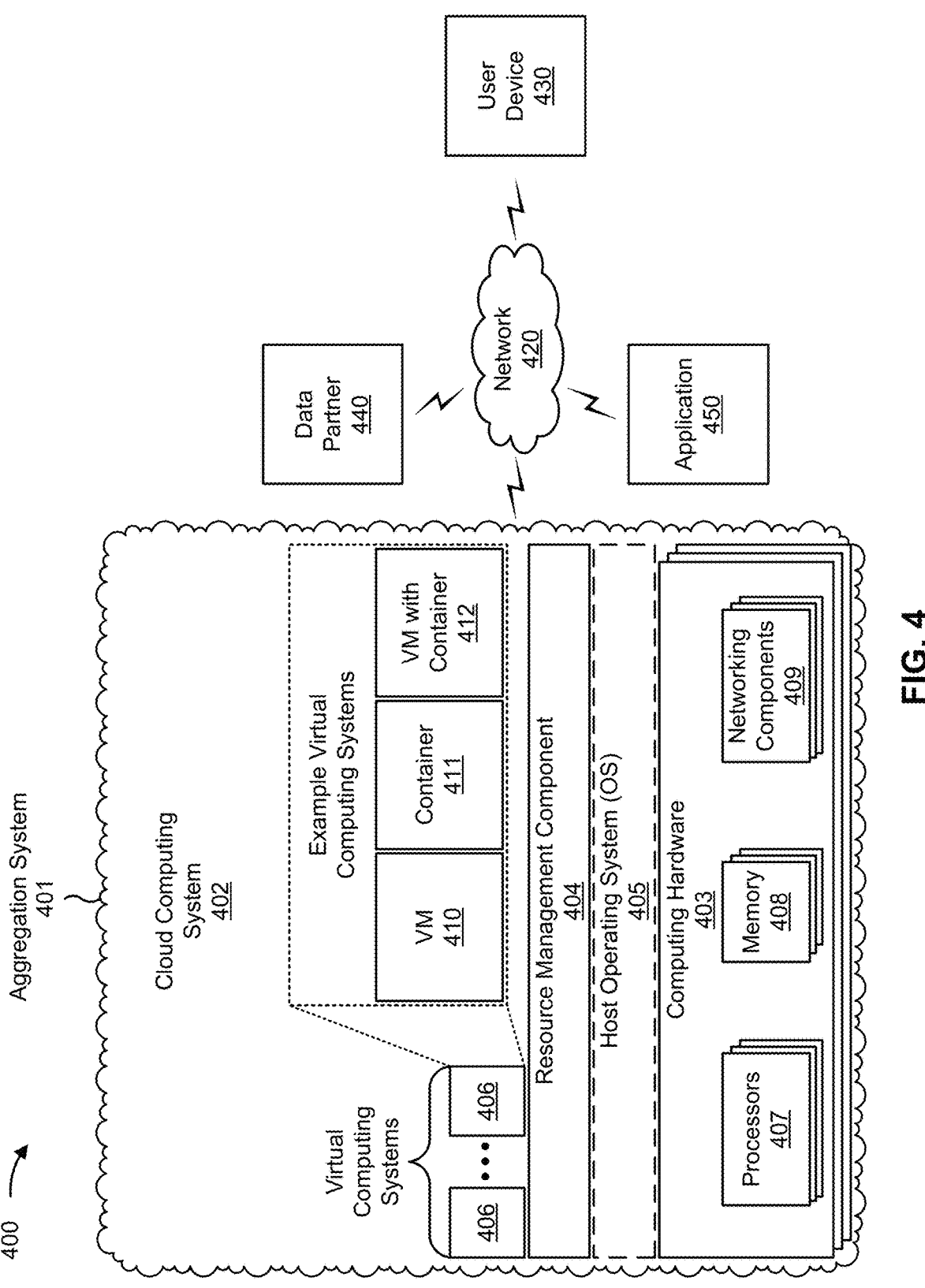
FIG. 4 is a diagram of an example environment in which systems and/or methods described herein may be implemented.

FIG. 4 is a diagram of an example environment 400 in which systems and/or methods described herein may be implemented. As shown in FIG. 4, environment 400 may include an aggregation system 401, which may include one or more elements of and/or may execute within a cloud computing system 402. The cloud computing system 402 may include one or more elements 403-412, as described in more detail below. As further shown in FIG. 4, environment 400 may include a network 420, a user device 430, a data partner 440, and/or an application 450. Devices and/or elements of environment 400 may interconnect via wired connections and/or wireless connections.

The cloud computing system 402 may include computing hardware 403, a resource management component 404, a host operating system (OS) 405, and/or one or more virtual computing systems 406. The cloud computing system 402 may execute on, for example, an Amazon Web Services platform, a Microsoft Azure platform, or a Snowflake platform. The resource management component 404 may perform virtualization (e.g., abstraction) of computing hardware 403 to create the one or more virtual computing systems 406. Using virtualization, the resource management component 404 enables a single computing device (e.g., a computer or a server) to operate like multiple computing devices, such as by creating multiple isolated virtual computing systems 406 from computing hardware 403 of the single computing device. In this way, computing hardware 403 can operate more efficiently, with lower power consumption, higher reliability, higher availability, higher utilization, greater flexibility, and lower cost than using separate computing devices.

The computing hardware 403 may include hardware and corresponding resources from one or more computing devices. For example, computing hardware 403 may include hardware from a single computing device (e.g., a single server) or from multiple computing devices (e.g., multiple servers), such as multiple computing devices in one or more data centers. As shown, computing hardware 403 may include one or more processors 407, one or more memories 408, and/or one or more networking components 409. Examples of a processor, a memory, and a networking component (e.g., a communication component) are described elsewhere herein.

The resource management component 404 may include a virtualization application (e.g., executing on hardware, such as computing hardware 403) capable of virtualizing computing hardware 403 to start, stop, and/or manage one or more virtual computing systems 406. For example, the resource management component 404 may include a hypervisor (e.g., a bare-metal or Type 1 hypervisor, a hosted or Type 2 hypervisor, or another type of hypervisor) or a virtual machine monitor, such as when the virtual computing systems 406 are virtual machines 410. Additionally, or alternatively, the resource management component 404 may include a container manager, such as when the virtual computing systems 406 are containers 411. In some implementations, the resource management component 404 executes within and/or in coordination with a host operating system 405.

A virtual computing system 406 may include a virtual environment that enables cloud-based execution of operations and/or processes described herein using computing hardware 403. As shown, a virtual computing system 406 may include a virtual machine 410, a container 411, or a hybrid environment 412 that includes a virtual machine and a container, among other examples. A virtual computing system 406 may execute one or more applications using a file system that includes binary files, software libraries, and/or other resources required to execute applications on a guest operating system (e.g., within the virtual computing system 406) or the host operating system 405.

Although the aggregation system 401 may include one or more elements 403-412 of the cloud computing system 402, may execute within the cloud computing system 402, and/or may be hosted within the cloud computing system 402, in some implementations, the aggregation system 401 may not be cloud-based (e.g., may be implemented outside of a cloud computing system) or may be partially cloud-based. For example, the aggregation system 401 may include one or more devices that are not part of the cloud computing system 402, such as device 500 of FIG. 5, which may include a standalone server or another type of computing device. The aggregation system 401 may perform one or more operations and/or processes described in more detail elsewhere herein.

The network 420 may include one or more wired and/or wireless networks. For example, the network 420 may include a cellular network, a public land mobile network (PLMN), a local area network (LAN), a wide area network (WAN), a private network, the Internet, and/or a combination of these or other types of networks. The network 420 enables communication among the devices of the environment 400.

The user device 430 may include one or more devices capable of receiving, generating, storing, processing, and/or providing information associated with accounts, as described elsewhere herein. The user device 430 may include a communication device and/or a computing device. For example, the user device 430 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device. The user device 430 may communicate with one or more other devices of environment 400, as described elsewhere herein.

The data partner 440 may include one or more devices capable of receiving, generating, storing, processing, and/or providing information associated with account, as described elsewhere herein. The data partner 440 may include a communication device and/or a computing device. For example, the data partner 440 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The data partner 440 may communicate with one or more other devices of environment 400, as described elsewhere herein.

The application 450 may be implemented on one or more devices capable of receiving, generating, storing, processing, providing, and/or routing information associated with accounts, as described elsewhere herein. The application 450 may be implemented on a communication device and/or a computing device. For example, the application 450 may be implemented on a server, such as an application server, a client server, a web server, a database server, a host server, a proxy server, a virtual server (e.g., executing on computing hardware), or a server in a cloud computing system. In some implementations, the application 450 may be implemented on computing hardware used in a cloud computing environment. The application 450 may communicate with one or more other devices of environment 400, as described elsewhere herein.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of the environment 400 may perform one or more functions described as being performed by another set of devices of the environment 400.

Figure 5:
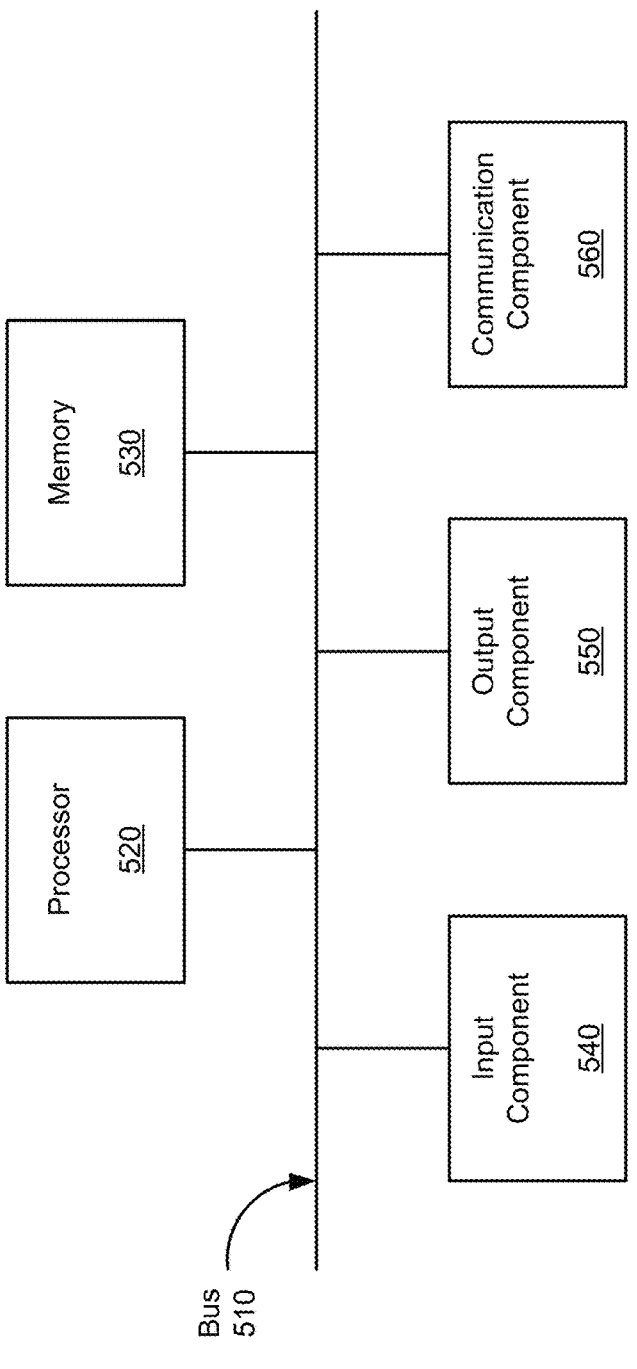
FIG. 5 is a diagram of example components of one or more devices of FIG. 4.

FIG. 5 is a diagram of example components of a device 500 associated with unlinking accounts from applications. The device 500 may correspond to the user device 430, the data partner 440, and/or a device implementing the application 450. In some implementations, the user device 430, the data partner 440, and/or the device implementing the application 450 may include one or more devices 500 and/or one or more components of the device 500. As shown in FIG. 5, the device 500 may include a bus 510, a processor 520, a memory 530, an input component 540, an output component 550, and/or a communication component 560.

The bus 510 may include one or more components that enable wired and/or wireless communication among the components of the device 500. The bus 510 may couple together two or more components of FIG. 5, such as via operative coupling, communicative coupling, electronic coupling, and/or electric coupling. For example, the bus 510 may include an electrical connection (e.g., a wire, a trace, and/or a lead) and/or a wireless bus. The processor 520 may include a central processing unit, a graphics processing unit, a microprocessor, a controller, a microcontroller, a digital signal processor, a field-programmable gate array, an application-specific integrated circuit, and/or another type of processing component. The processor 520 may be implemented in hardware, firmware, or a combination of hardware and software. In some implementations, the processor 520 may include one or more processors capable of being programmed to perform one or more operations or processes described elsewhere herein.

The memory 530 may include volatile and/or nonvolatile memory. For example, the memory 530 may include random access memory (RAM), read only memory (ROM), a hard disk drive, and/or another type of memory (e.g., a flash memory, a magnetic memory, and/or an optical memory). The memory 530 may include internal memory (e.g., RAM, ROM, or a hard disk drive) and/or removable memory (e.g., removable via a universal serial bus connection). The memory 530 may be a non-transitory computer-readable medium. The memory 530 may store information, one or more instructions, and/or software (e.g., one or more software applications) related to the operation of the device 500. In some implementations, the memory 530 may include one or more memories that are coupled (e.g., communicatively coupled) to one or more processors (e.g., processor 520), such as via the bus 510. Communicative coupling between a processor 520 and a memory 530 may enable the processor 520 to read and/or process information stored in the memory 530 and/or to store information in the memory 530.

The input component 540 may enable the device 500 to receive input, such as user input and/or sensed input. For example, the input component 540 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 550 may enable the device 500 to provide output, such as via a display, a speaker, and/or a light-emitting diode. The communication component 560 may enable the device 500 to communicate with other devices via a wired connection and/or a wireless connection. For example, the communication component 560 may include a receiver, a transmitter, a transceiver, a modem, a network interface card, and/or an antenna.

The device 500 may perform one or more operations or processes described herein. For example, a non-transitory computer-readable medium (e.g., memory 530) may store a set of instructions (e.g., one or more instructions or code) for execution by the processor 520. The processor 520 may execute the set of instructions to perform one or more operations or processes described herein. In some implementations, execution of the set of instructions, by one or more processors 520, causes the one or more processors 520 and/or the device 500 to perform one or more operations or processes described herein. In some implementations, hardwired circuitry may be used instead of or in combination with the instructions to perform one or more operations or processes described herein. Additionally, or alternatively, the processor 520 may be configured to perform one or more operations or processes described herein. Thus, implementations described herein are not limited to any specific combination of hardware circuitry and software.

The number and arrangement of components shown in FIG. 5 are provided as an example. The device 500 may include additional components, fewer components, different components, or differently arranged components than those shown in FIG. 5. Additionally, or alternatively, a set of components (e.g., one or more components) of the device 500 may perform one or more functions described as being performed by another set of components of the device 500.

FIG. 6 is a flowchart of an example process 600 associated with unlinking accounts from applications. In some implementations, one or more process blocks of FIG. 6 may be performed by an aggregation system 401. In some implementations, one or more process blocks of FIG. 6 may be performed by another device or a group of devices separate from or including the aggregation system 401, such as a user device 430, a data partner 440, and/or a device implementing an application 450. Additionally, or alternatively, one or more process blocks of FIG. 6 may be performed by one or more components of the device 500, such as processor 520, memory 530, input component 540, output component 550, and/or communication component 560.

As shown in FIG. 6, process 600 may include receiving a first request associated with a user account and including a secret associated with an administrator (block 610). For example, the aggregation system 401 (e.g., using processor 520, memory 530, and/or communication component 560) may receive a first request associated with a user account and including a secret associated with an administrator, as described above in connection with reference number 110 of FIG. 1A.

As further shown in FIG. 6, process 600 may include transmitting a first response including an access token based on the secret (block 620). For example, the aggregation system 401 (e.g., using processor 520, memory 530, and/or communication component 560) may transmit a first response including an access token based on the secret, as described above in connection with reference number 115 of FIG. 1A.

As further shown in FIG. 6, process 600 may include receiving a second request for a list of applications associated with the user account, wherein the second request includes the access token (block 630). For example, the aggregation system 401 (e.g., using processor 520, memory 530, and/or communication component 560) may receive a second request for a list of applications associated with the user account, wherein the second request includes the access token, as described above in connection with reference number 120 of FIG. 1B.

As further shown in FIG. 6, process 600 may include transmitting a second response including the list of applications in response to the second request (block 640). For example, the aggregation system 401 (e.g., using processor 520, memory 530, and/or communication component 560) may transmit a second response including the list of applications in response to the second request, as described above in connection with reference number 125 of FIG. 1B.

As further shown in FIG. 6, process 600 may include receiving a third request for a list of activities associated with the list of applications, wherein the third request includes the access token (block 650). For example, the aggregation system 401 (e.g., using processor 520, memory 530, and/or communication component 560) may receive a third request for a list of activities associated with the list of applications, wherein the third request includes the access token, as described above in connection with reference number 140 of FIG. 1C.

As further shown in FIG. 6, process 600 may include transmitting a third response including the list of activities in response to the third request (block 660). For example, the aggregation system 401 (e.g., using processor 520, memory 530, and/or communication component 560) may transmit a third response including the list of activities in response to the third request, as described above in connection with reference number 145 of FIG. 1C.

As further shown in FIG. 6, process 600 may include receiving a fourth request to unlink a selected application, from the list of applications, from the user account, wherein the fourth request includes the access token (block 670). For example, the aggregation system 401 (e.g., using processor 520, memory 530, and/or communication component 560) may receive a fourth request to unlink a selected application, from the list of applications, from the user account, wherein the fourth request includes the access token, as described above in connection with reference number 170 of FIG. 1E.

As further shown in FIG. 6, process 600 may include revoking a token associated with the selected application (block 680). For example, the aggregation system 401 (e.g., using processor 520 and/or memory 530) may revoke a token associated with the selected application, as described above in connection with reference number 175 of FIG. 1E.

As further shown in FIG. 6, process 600 may include transmitting an indication that the token associated with the selected application was revoked (block 690). For example, the aggregation system 401 (e.g., using processor 520, memory 530, and/or communication component 560) may transmit an indication that the token associated with the selected application was revoked, as described above in connection with reference number 185 of FIG. 1E.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel. The process 600 is an example of one process that may be performed by one or more devices described herein. These one or more devices may perform one or more other processes based on operations described herein, such as the operations described in connection with FIGS. 1A-IE and/or 2A-2G.

FIG. 7 is a flowchart of an example process 700 associated with unlinking accounts from applications. In some implementations, one or more process blocks of FIG. 7 may be performed by a data partner 440. In some implementations, one or more process blocks of FIG. 7 may be performed by another device or a group of devices separate from or including the data partner 440, such as an aggregation system 401, a user device 430, and/or a device implementing an application 450. Additionally, or alternatively, one or more process blocks of FIG. 7 may be performed by one or more components of the device 500, such as processor 520, memory 530, input component 540, output component 550, and/or communication component 560.

As shown in FIG. 7, process 700 may include transmitting a first request associated with a user account and including a secret associated with an administrator (block 710). For example, the data partner 440 (e.g., using processor 520, memory 530, and/or communication component 560) may transmit a first request associated with a user account and including a secret associated with an administrator, as described above in connection with reference number 110 of FIG. 1A.

As further shown in FIG. 7, process 700 may include receiving a first response including an access token based on the secret (block 720). For example, the data partner 440 (e.g., using processor 520, memory 530, and/or communication component 560) may receive a first response including an access token based on the secret, as described above in connection with reference number 115 of FIG. 1A.

As further shown in FIG. 7, process 700 may include transmitting a second request for a list of applications associated with the user account, wherein the second request includes the access token (block 730). For example, the data partner 440 (e.g., using processor 520, memory 530, and/or communication component 560) may transmit a second request for a list of applications associated with the user account, wherein the second request includes the access token, as described above in connection with reference number 120 of FIG. 1B.

As further shown in FIG. 7, process 700 may include receiving a second response including the list of applications in response to the second request (block 740). For example, the data partner 440 (e.g., using processor 520, memory 530, and/or communication component 560) may receive a second response including the list of applications in response to the second request, as described above in connection with reference number 125 of FIG. 1B.

As further shown in FIG. 7, process 700 may include transmitting a third request for a list of activities associated with the list of applications, wherein the third request includes the access token (block 750). For example, the data partner 440 (e.g., using processor 520, memory 530, and/or communication component 560) may transmit a third request for a list of activities associated with the list of applications, wherein the third request includes the access token, as described above in connection with reference number 140 of FIG. 1C.

As further shown in FIG. 7, process 700 may include receiving a third response including the list of activities in response to the third request (block 760). For example, the data partner 440 (e.g., using processor 520, memory 530, and/or communication component 560) may receive a third response including the list of activities in response to the third request, as described above in connection with reference number 145 of FIG. 1C.

As further shown in FIG. 7, process 700 may include transmitting a fourth request to unlink a selected application, from the list of applications, from the user account, wherein the fourth request includes the access token (block 770). For example, the data partner 440 (e.g., using processor 520, memory 530, and/or communication component 560) may transmit a fourth request to unlink a selected application, from the list of applications, from the user account, wherein the fourth request includes the access token, as described above in connection with reference number 170 of FIG. 1E.

As further shown in FIG. 7, process 700 may include receiving an indication that a token associated with the selected application was revoked (block 780). For example, the data partner 440 (e.g., using processor 520, memory 530, and/or communication component 560) may receive an indication that a token associated with the selected application was revoked, as described above in connection with reference number 185 of FIG. 1E.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel. The process 700 is an example of one process that may be performed by one or more devices described herein. These one or more devices may perform one or more other processes based on operations described herein, such as the operations described in connection with FIGS. 1A-1E and/or 2A-2G.

FIG. 8 is a flowchart of an example process 800 associated with verifying connections with a data partner. In some implementations, one or more process blocks of FIG. 8 may be performed by an aggregation system 401. In some implementations, one or more process blocks of FIG. 8 may be performed by another device or a group of devices separate from or including the aggregation system 401, such as a user device 430, a data partner 440, and/or a device implementing an application 450. Additionally, or alternatively, one or more process blocks of FIG. 8 may be performed by one or more components of the device 500, such as processor 520, memory 530, input component 540, output component 550, and/or communication component 560.

As shown in FIG. 8, process 800 may include receiving, from a data partner, a first request, for a list of users associated with the data partner, that includes a set of filters (block 810). For example, the aggregation system 401 (e.g., using processor 520, memory 530, and/or communication component 560) may receive, from a data partner, a first request, for a list of users associated with the data partner, that includes a set of filters, as described above in connection with reference number 340 of FIG. 3C.

As further shown in FIG. 8, process 800 may include determining the list of users using the set of filters (block 820). For example, the aggregation system 401 (e.g., using processor 520 and/or memory 530) may determine the list of users using the set of filters, as described above in connection with FIG. 3C.

As further shown in FIG. 8, process 800 may include transmitting a first response including the list of users in response to the first request (block 830). For example, the aggregation system 401 (e.g., using processor 520, memory 530, and/or communication component 560) may transmit a first response including the list of users in response to the first request, as described above in connection with reference number 345 of FIG. 3C.

As further shown in FIG. 8, process 800 may include receiving a second request for metadata associated with applications authorized to receive data from the data partner (block 840). For example, the aggregation system 401 (e.g., using processor 520, memory 530, and/or communication component 560) may receive a second request for metadata associated with applications authorized to receive data from the data partner, as described above in connection with reference number 350 of FIG. 3D.

As further shown in FIG. 8, process 800 may include transmitting, in response to the second request, a second response including the metadata (block 850). For example, the aggregation system 401 (e.g., using processor 520, memory 530, and/or communication component 560) may transmit, in response to the second request, a second response including the metadata, as described above in connection with reference number 355 of FIG. 3D.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel. The process 800 is an example of one process that may be performed by one or more devices described herein. These one or more devices may perform one or more other processes based on operations described herein, such as the operations described in connection with FIGS. 3A-3D.

FIG. 9 is a flowchart of an example process 900 associated with verifying connections with a data partner. In some implementations, one or more process blocks of FIG. 9 may be performed by a data partner 440. In some implementations, one or more process blocks of FIG. 9 may be performed by another device or a group of devices separate from or including the data partner 440, such as an aggregator system 401, a user device 430, and/or a device implementing an application 450. Additionally, or alternatively, one or more process blocks of FIG. 9 may be performed by one or more components of the device 500, such as processor 520, memory 530, input component 540, output component 550, and/or communication component 560.

As shown in FIG. 9, process 900 may include transmitting a first request, for a list of users associated with a data partner, that includes a set of filters (block 910). For example, the data partner 440 (e.g., using processor 520, memory 530, and/or communication component 560) may transmit a first request, for a list of users associated with the data partner, that includes a set of filters, as described above in connection with reference number 340 of FIG. 3C.

As further shown in FIG. 9, process 900 may include receiving a first response including the list of users in response to the first request (block 920). For example, the data partner 440 (e.g., using processor 520, memory 530, and/or communication component 560) may receive a first response including the list of users in response to the first request, as described above in connection with reference number 345 of FIG. 3C.

As further shown in FIG. 9, process 900 may include transmitting a second request for metadata associated with applications authorized to receive data from the data partner (block 930). For example, the data partner 440 (e.g., using processor 520, memory 530, and/or communication component 560) may transmit a second request for metadata associated with applications authorized to receive data from the data partner, as described above in connection with reference number 350 of FIG. 3D.

As further shown in FIG. 9, process 900 may include receiving, in response to the second request, a second response including the metadata (block 940). For example, the data partner 440 (e.g., using processor 520, memory 530, and/or communication component 560) may receive, in response to the second request, a second response including the metadata, as described above in connection with reference number 355 of FIG. 3D.

Although FIG. 9 shows example blocks of process 900, in some implementations, process 800 may include additional blocks, fewer blocks, different blocks, or differently arranged blocks than those depicted in FIG. 9. Additionally, or alternatively, two or more of the blocks of process 900 may be performed in parallel. The process 900 is an example of one process that may be performed by one or more devices described herein. These one or more devices may perform one or more other processes based on operations described herein, such as the operations described in connection with FIGS. 3A-3D.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for unlinking accounts for applications, the system comprising:
   one or more memories; and
   one or more processors, communicatively coupled to the one or more memories, configured to:
      receive a first request associated with a user account and including a secret associated with an administrator;
      transmit a first response including an access token based on the secret;
      receive a second request for a list of applications associated with the user account, wherein the second request includes the access token;
      transmit a second response including the list of applications in response to the second request;
      receive a third request for a list of activities associated with the list of applications, wherein the third request includes the access token;
      transmit a third response including the list of activities in response to the third request;
      receive a fourth request to unlink a selected application, from the list of applications, from the user account, wherein the fourth request includes the access token;
      revoke a token associated with the selected application; and
      transmit an indication that the token associated with the selected application was revoked.

2. The system of claim 1, wherein the access token is further based on the user account.

3. The system of claim 1, wherein the first request further includes an identifier of the user account that is persistent and unique.

4. The system of claim 1, wherein the second response further includes an identifier associated with the second request.

5. The system of claim 1, wherein the third response further includes a list of most recent access times associated with the list of applications.

6. The system of claim 5, wherein each most recent access time, in the list of most recent access times, is associated with:
   an identifier associated with one application in the list of applications;

a datetime associated with an activity;

a type of the activity; and a state associated with the activity.

7. The system of claim 1, wherein each activity, in the list of activities, is associated with:

an identifier associated with one application in the list of applications;

a datetime associated with a first type of access to the user account; and a datetime associated with a second type of access to the user account.

8. A method of unlinking accounts for applications, comprising:

transmitting a first request associated with a user account and including a secret associated with an administrator;

receiving a first response including an access token based on the secret;

transmitting a second request for a list of applications associated with the user account, wherein the second request includes the access token;

receiving a second response including the list of applications in response to the second request;

transmitting a third request for a list of activities associated with the list of applications, wherein the third request includes the access token;

receiving a third response including the list of activities in response to the third request;

transmitting a fourth request to unlink a selected application, from the list of applications, from the user account, wherein the fourth request includes the access token; and receiving an indication that a token associated with the selected application was revoked.

9. The method of claim 8, wherein the access token is further based on the user account.

10. The method of claim 8, wherein transmitting the first request comprises:

transmitting the first request including an identifier of the user account that is persistent and unique.

11. The method of claim 8, further comprising:

storing an identifier, associated with the second request, that was included in the second response.

12. The method of claim 8, wherein the third response further includes a list of most recent access times associated with the list of applications.

13. The method of claim 12, wherein each most recent access time, in the list of most recent access times, is associated with:

an identifier associated with one application in the list of applications;

a datetime associated with an activity;

a type of the activity; and a state associated with the activity.

14. The method of claim 8, wherein each activity, in the list of activities, is associated with:

an identifier associated with one application in the list of applications;

a datetime associated with a first type of access to the user account; and a datetime associated with a second type of access to the user account.

15. A non-transitory computer-readable medium storing a set of instructions, the set of instructions comprising:

one or more instructions that, when executed by one or more processors of a device, cause the device to:

receive a first request associated with a user account and including a secret associated with an administrator;

transmit a first response including an access token based on the secret;

receive a second request for a list of applications associated with the user account, wherein the second request includes the access token;

transmit a second response including the list of applications in response to the second request;

receive a third request for a list of activities associated with the list of applications, wherein the third request includes the access token;

transmit a third response including the list of activities in response to the third request;

receive a fourth request to unlink a selected application, from the list of applications, from the user account, wherein the fourth request includes the access token;

revoke a token associated with the selected application; and transmit an indication that the token associated with the selected application was revoked.

16. The non-transitory computer-readable medium of claim 15, wherein the access token is further based on the user account.

17. The non-transitory computer-readable medium of claim 15, wherein the first request further includes an identifier of the user account that is persistent and unique.

18. The non-transitory computer-readable medium of claim 15, wherein the second response further includes an identifier associated with the second request.

19. The non-transitory computer-readable medium of claim 15, wherein the third response further includes a list of most recent access times associated with the list of applications.

* * * * *